US010911359B2

(12) United States Patent
Osuga

(10) Patent No.: US 10,911,359 B2
(45) Date of Patent: Feb. 2, 2021

(54) TRANSMIT DATA VOLUME CONTROL DEVICE, METHOD, AND RECORDING MEDIUM

(71) Applicant: NEC CORPORATION, Tokyo (JP)

(72) Inventor: Toru Osuga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 295 days.

(21) Appl. No.: 16/067,882

(22) PCT Filed: Jan. 4, 2017

(86) PCT No.: PCT/JP2017/000006
§ 371 (c)(1),
(2) Date: Jul. 3, 2018

(87) PCT Pub. No.: WO2017/119408
PCT Pub. Date: Jul. 13, 2017

(65) Prior Publication Data
US 2020/0267083 A1     Aug. 20, 2020

(30) Foreign Application Priority Data

Jan. 7, 2016   (JP) ................................ 2016-001570

(51) Int. Cl.
*H04L 12/801* (2013.01)
*H04L 12/26* (2006.01)
*H04L 12/851* (2013.01)

(52) U.S. Cl.
CPC .......... *H04L 47/12* (2013.01); *H04L 43/0817* (2013.01); *H04L 43/0841* (2013.01); *H04L 43/0894* (2013.01); *H04L 47/24* (2013.01)

(58) Field of Classification Search
CPC ..... H04L 47/12; H04L 43/0817; H04L 47/24; H04L 43/0841; H04L 43/0894
See application file for complete search history.

(56) References Cited

U.S. PATENT DOCUMENTS

2012/0311043 A1* 12/2012 Chen ................ H04N 21/23406
709/204
2017/0353386 A1* 12/2017 Wang ...................... H04L 47/12
2018/0338264 A1* 11/2018 Kim .................... H04L 43/0841

FOREIGN PATENT DOCUMENTS

| JP | 2013-191931 A | 9/2013 |
| JP | 2013-223181 A | 10/2013 |
| WO | 2014/098096 A1 | 6/2014 |

OTHER PUBLICATIONS

Sangtae HA, et al., "CUBIC: A New TCP-Friendly High-Speed TCP Variant", Proceedings of the ACM SIGOPS, Jul. 2008, pp. 64-74, vol. 42, No. 5.

(Continued)

*Primary Examiner* — Thai Nguyen
(74) *Attorney, Agent, or Firm* — Sughrue Mion, PLLC

(57) ABSTRACT

In order to enable controlling a transmit data volume within a proper range depending on variations in a communication environment, suppressing deterioration in utilization efficiency of a transmission bandwidth, and improving user perceived quality, a transmit data volume control method according to an exemplary aspect of the invention includes: acquiring a communication quality of a network, estimating a congestion degree of the network, determining a target congestion degree being a target of the congestion degree, based on the communication quality, and determining a transmit data volume, based on the congestion degree and the target congestion degree.

20 Claims, 10 Drawing Sheets

(56) References Cited

OTHER PUBLICATIONS

S. Floyd, et al., "The NewReno Modification to TCP's Fast Recovery Algorithm", Network working Group, Request for Comments: 2582, Apr. 1999, 12 pages.
Cheng Jin, et al., "FAST TCP: Motivation, Architecture, Algorithms, Performance", Proceedings of IEEE INFOCOM 2004, Mar. 2004, pp. 2490-2501, vol. 4.
Ken Igarashi, et al., "Flight Size Auto Tuning for Broadband Wireless Networks", Proceedings of the 2009 International Conference on Wireless Communications and Mobile Computing: Connecting the World Wirelessly, 2009, pp. 888-893.
International Search Report for PCT/JP2017/000006 dated Mar. 28, 2017 [PCT/ISA/210].
Written Opinion for PCT/JP2017/000006 dated Mar. 28, 2017 [PCT/ISA/237].

\* cited by examiner

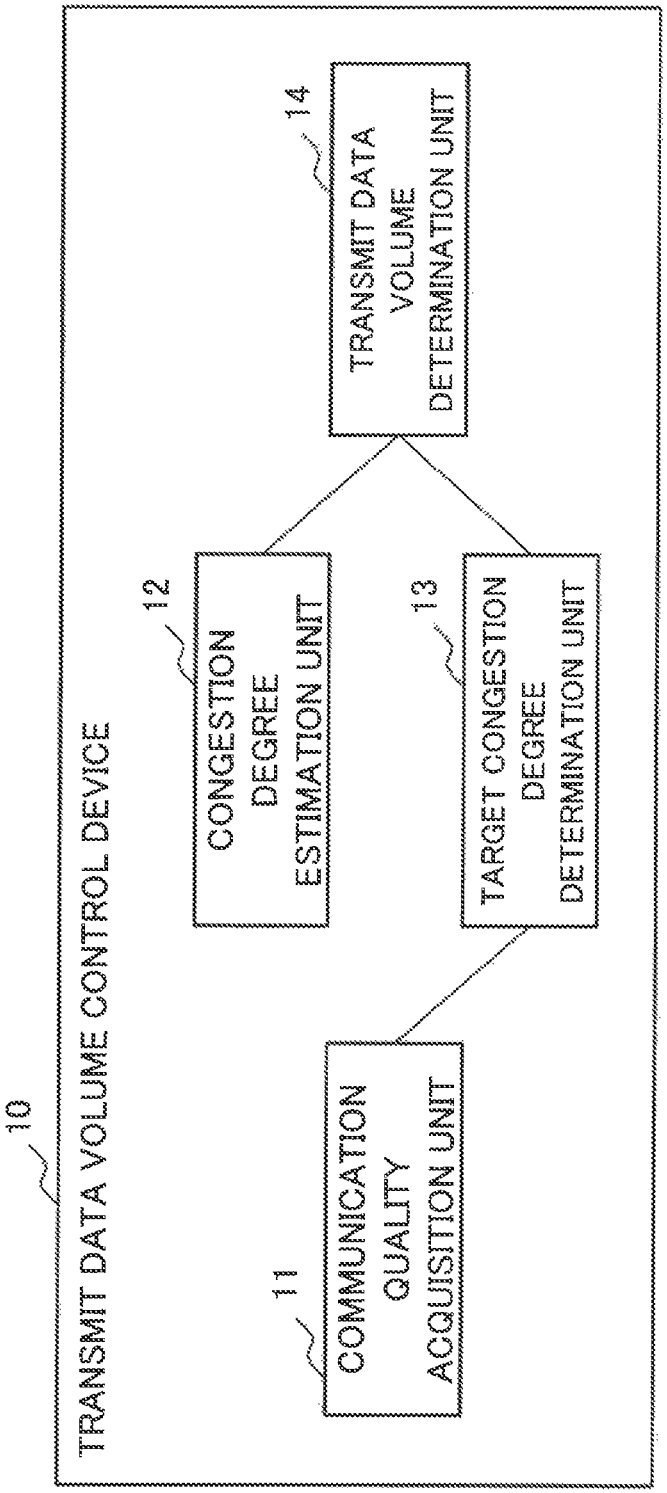

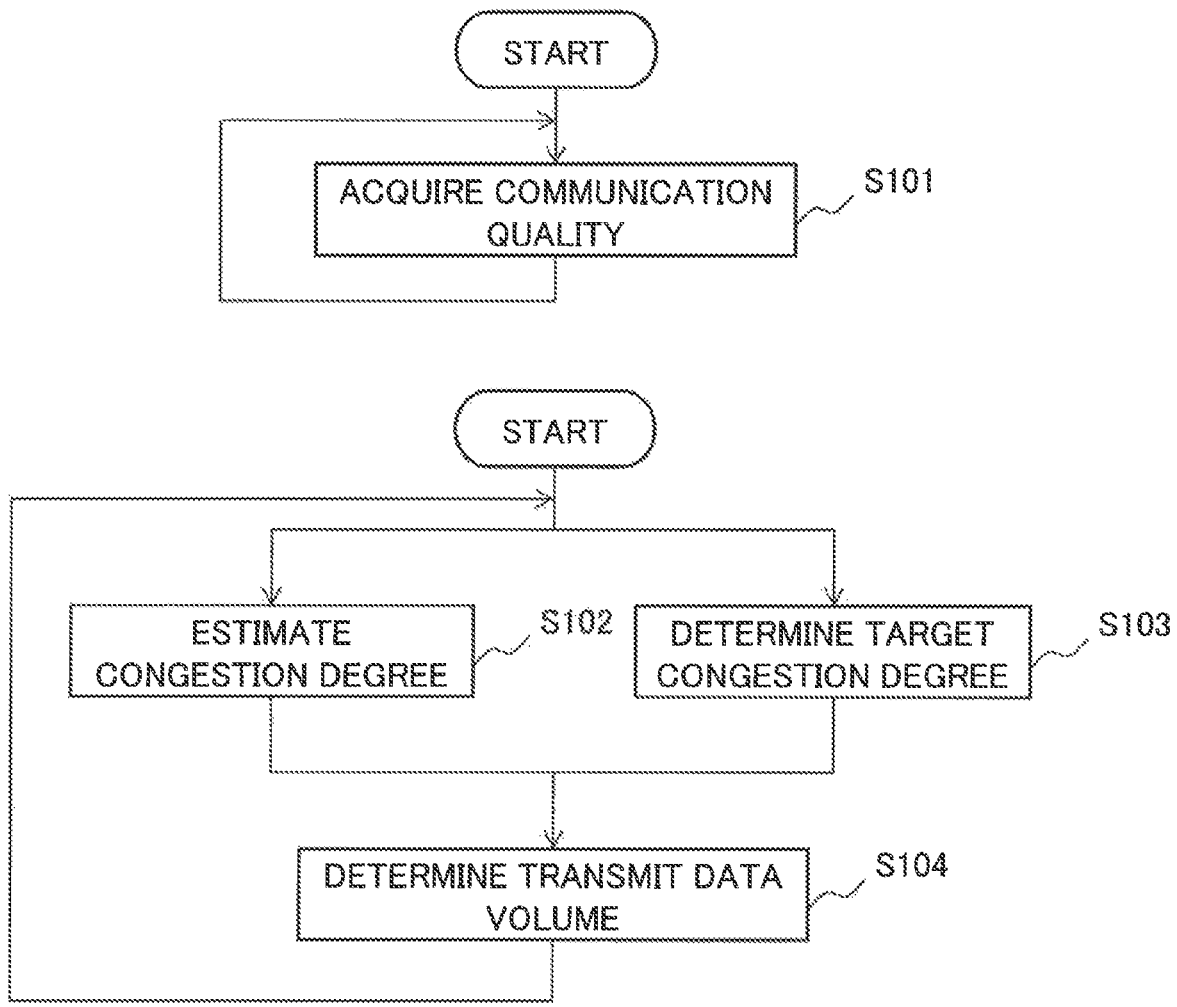
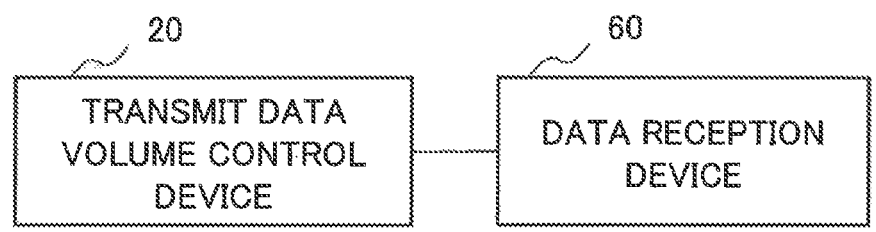

TRANSMIT DATA VOLUME CONTROL DEVICE, METHOD, AND RECORDING MEDIUM

CROSS REFERENCE TO RELATED APPLICATIONS

This application is a National Stage of International Application No. PCT/JP2017/000006, filed on Jan. 4, 2017, which claims priority from Japanese Patent Application No. 2016-001570, filed on Jan. 7, 2016, the disclosure of which is incorporated herein in its entirety by reference.

TECHNICAL FIELD

The present invention relates to a transmit data volume control device, a system, a method, and a recording medium that control a data volume of transmit data.

BACKGROUND ART

In recent years, information delivery by rich media has become available to be viewed anywhere and anytime through a mobile terminal, with line capacity enhancement in the Internet and development of underlying technologies handling diverse media information. Such a life style is widely penetrating, and mobile communication technologies such as Long Term Evolution (LTE) and LTE Advanced (LTE-A) are widely spreading as a high-speed mobile environment supporting the information delivery.

In a high-speed mobile communication environment such as LTE, a high-capacity buffer is provided in a base station device in a mobile network, such as an eNodeB, in order to absorb influence of bandwidth variation in a wireless section. Further, when bit errors occur in a wireless section, an Automatic Repeat reQuest (ARQ) technology in a radio link control (RLC) layer and a Hybrid ARQ (HARQ) technology in a media access control (MAC) layer restore data by retransmission in a lower layer. Accordingly, packet corruption rarely occurs in a layer higher than a network layer.

By contrast, a transmission control protocol (TCP) being a transport layer protocol widely used in both wired and wireless data communication mainly uses a loss-based congestion control system. The loss-based congestion control system is a system determining occurrence of congestion (network congestion) when detecting a packet loss, and reducing a transmission rate, as typified by CUBIC TCP (NPL 1) and TCP NewReno (NPL 2).

As described above, packet corruption following bit errors rarely occurs in recent mobile communication. Accordingly, TCP using a loss-based congestion control system keeps on increasing a transmission rate represented by, for example, a congestion window size (cwnd) until a packet loss occurs due to buffer overflow.

When a packet loss occurs after a cwnd becomes enormous, a data volume that can be transmitted following retransmission of a lost packet is decreased, and therefore data transmission may halt. When data transmission halts following a packet loss, reduction in TCP throughput, interruption of playback of a streaming content such as an image and a voice, and the like occur, and user perceived quality deteriorates significantly.

Further, a packet loss may occur without network congestion in mobile communication when a user terminal enters an edge of a cell or behind a building, or during handover processing, following a move by a user. However, a loss-based congestion control system suppresses a transmit data volume by unnecessarily reducing a cwnd upon occurrence of a packet loss even when a network is not congested. Accordingly, the suppression leads to reduced TCP throughput, and user perceived quality deteriorates significantly.

In contrast to such a loss-based congestion control system, a method described in NPL 3 estimates a queueing delay and calculates a cwnd, based on the queueing delay. The method controls an upper limit of a volume of transmissible data packets (transmit data volume) in such a way that a data volume retained in a router on a transmission line is kept within a certain range. By an estimation function, the method estimates, as a queueing delay, a difference between a round trip time of a packet and a minimum round trip time value in the identical session, while performing communication by TCP. Then, by a window control function, the method exponentially increases the cwnd when the queueing delay is nearly zero and otherwise calculates the cwnd, based on a ratio between the round trip time and the minimum round trip time value, and a desired value of the cwnd. Since the method detects network congestion with a queueing delay, reduction in TCP throughput and a halt in data transmission are reduced compared with a loss-based system, and user perceived quality can be improved.

Further, when transmitting data from a terminal to a base station, a method described in PTL 1 estimates a data volume retained in a transmit buffer in the terminal, based on throughput of data received by the base station, and allocates a transmission bandwidth, based on the retained data volume. Further, a method described in PTL 2 assumes a product of a network bandwidth and a round trip time to be an optimum value of a cwnd, and determines a cwnd after path switching, based on a rate of change in a round trip time or a bandwidth between a working system and a standby system.

CITATION LIST

Patent Literature

[PTL 1] Japanese Laid-open Patent Publication No. 2013-223181
[PTL 2] Japanese Laid-open Patent Publication No. 2013-191931

Non Patent Literature

[NPL 1] Sangtae Ha and two others, "CUBIC: A New TCP-Friendly High-Speed TCP Variant," Proceedings of the ACM SIGOPS, July, 2008, vol. 42, no. 5, pp. 64 to 74
[NPL 2] S. Floyd and one other, "The NewReno Modification to TCP's Fast Recovery Algorithm," RFC 2582, April, 1999
[NPL 3] Cheng Jin and two others, "FAST TCP: Motivation, Architecture, Algorithms, Performance," Proceedings of IEEE INFOCOM 2004, March, 2004, vol. 4, pp. 2490 to 2501

SUMMARY OF INVENTION

Technical Problem

However, the methods described in NPL 3 and PTL 2 are methods assuming application to a network with a stable bandwidth, such as a fixed network. Accordingly, the methods are not able to properly control an upper limit of a transmit data volume when applied to a network, such as a mobile network, in which a wireless bandwidth and a propagation delay drastically vary with a move of a user terminal and variations in a radio field intensity.

Specifically, the method described in NPL 3 controls a cwnd in such a way that a data volume retained in a router on a transmission line is kept within a certain range. However, in a mobile network, a proper retained data volume fluctuates depending on a variation range of a wireless bandwidth and the like. For example, when a retained data volume is less than a proper value, the network falls into a state in which retained data are exhausted and data to be transmitted no longer exist in spite of readiness to transmit more data, as a transmissible data volume sharply increases after a sharp improvement in a radio environment. In other words, utilization efficiency of a transmission bandwidth deteriorates. On the other hand, when a retained data volume is excessive, there is a possibility of a delay in data arrival at a terminal or a delay in a start of another communication session. Accordingly, since the method described in NPL 3 controls a cwnd without consideration for variations in a communication environment, deterioration in utilization efficiency of a transmission bandwidth due to buffer exhaustion and increase in delay due to excessive data retainment may occur.

Further, the method described in PTL 2 assumes that an optimum cwnd value is a product of a network bandwidth and a round trip time, and determines the cwnd depending on a rate of change in a round trip time or a bandwidth before and after path switching. However, since the method assumes path switching in a fixed network, fluctuations in a proper retained data volume due to variations in a communication environment are not considered, similarly to NPL 3. Accordingly, deterioration in utilization efficiency of a transmission bandwidth due to buffer exhaustion and increase in delay due to excessive data retainment may occur.

Further, the method described in PTL 1 estimates a data volume retained in a transmit buffer in a terminal, based on throughput, and allocates a transmission bandwidth, based on the retained data volume. However, the method also considers fluctuations in a proper retained data volume due to variations in a communication environment only in a limited manner. Accordingly, deterioration in utilization efficiency of a transmission bandwidth due to buffer exhaustion and increase in delay due to excessive data retainment may occur.

An object of the present invention is to provide a transmit data volume control device, a method, and a recording medium that can control a transmit data volume within a proper range depending on variations in a communication environment, suppress deterioration in utilization efficiency of a transmission bandwidth, and improve user perceived quality.

Solution to Problem

For settling the above-mentioned problem, a transmit data volume control device according to an exemplary aspect of the invention comprises: a communication quality acquisition means for acquiring a communication quality of a network, a congestion degree estimation means for estimating a congestion degree of the network, a target congestion degree determination means for determining a target congestion degree being a target of the congestion degree, based on the communication quality, and a transmit data volume determination means for determining a transmit data volume, based on the congestion degree and the target congestion degree.

And, a transmit data volume control method according to an exemplary aspect of the invention comprises: acquiring a communication quality of a network, estimating a congestion degree of the network, determining a target congestion degree being a target of the congestion degree, based on the communication quality, and determining a transmit data volume, based on the congestion degree and the target congestion degree.

And, a computer readable recording medium according to an exemplary aspect of the invention is recorded with a transmit data volume control program causing a computer to execute: a communication quality acquisition function of acquiring a communication quality of a network, a congestion degree estimation function of estimating a congestion degree of the network, a target congestion degree determination function of determining a target congestion degree being a target of the congestion degree, based on the communication quality, and a transmit data volume determination function of determining a transmit data volume, based on the congestion degree and the target congestion degree.

Advantageous Effects of Invention

The transmit data volume control device, the method, and the recording medium, according to the present invention, can control a transmit data volume within a proper range depending on variations in a communication environment, suppress deterioration in utilization efficiency of a transmission bandwidth, and improve user perceived quality.

BRIEF DESCRIPTION OF DRAWINGS

FIG. 1 shows a diagram illustrating a configuration example of a transmit data volume control device according to a first example embodiment of the present invention.

FIG. 2 shows a diagram illustrating an operation example of the transmit data volume control device according to the first example embodiment of the present invention.

FIG. 3 shows a diagram illustrating a configuration example of a transmit data volume control system according to a second example embodiment of the present invention.

EXAMPLE EMBODIMENT

First Example Embodiment

Figure 4:
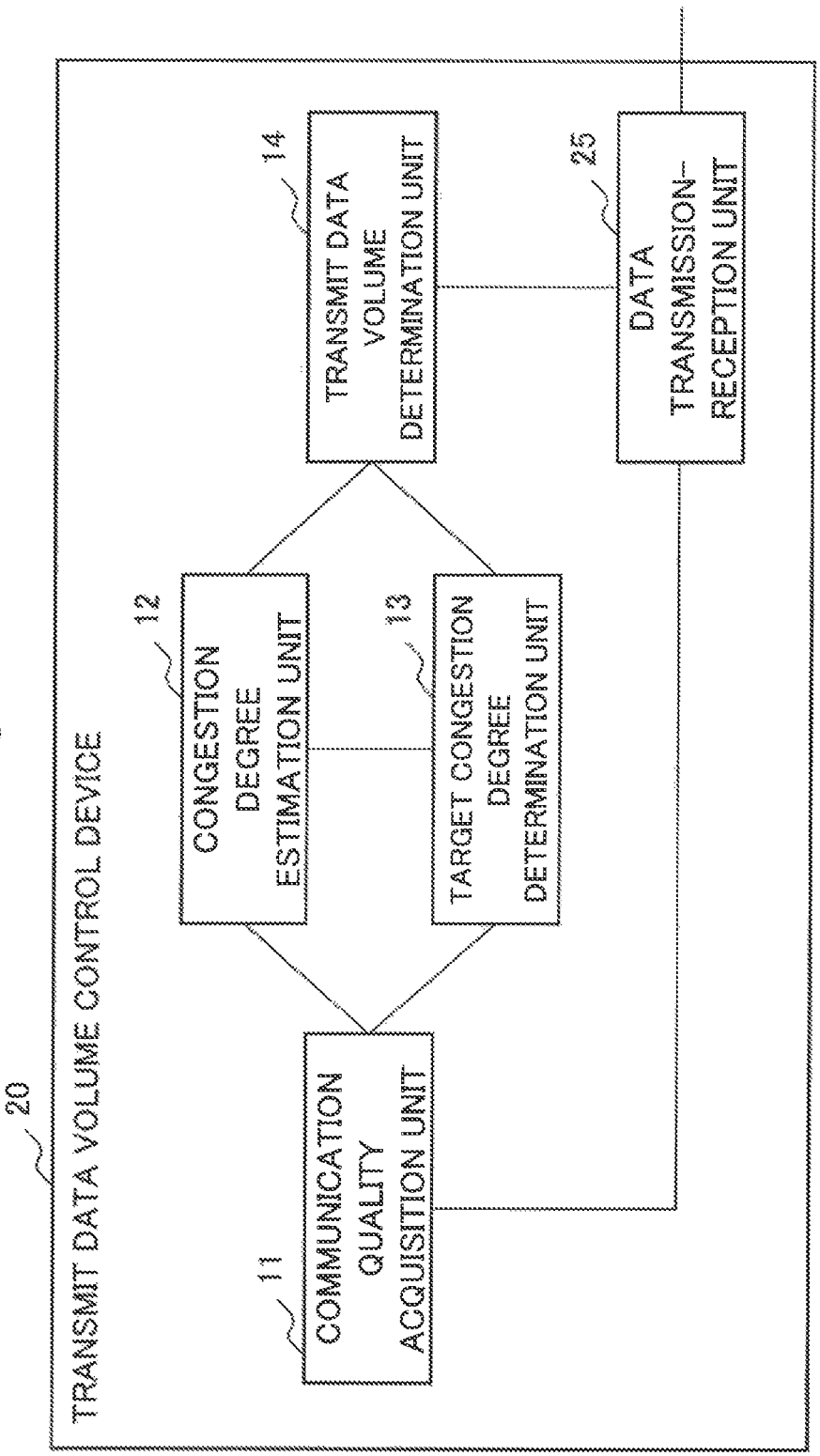
FIG. 4 shows a diagram illustrating a configuration example of a transmit data volume control device according to the second example embodiment of the present invention.

A first example embodiment of the present invention will be described.

FIG. 1 illustrates a configuration example of a transmit data volume control device 10 according to the present example embodiment. The transmit data volume control device 10 according to the present example embodiment includes a communication quality acquisition unit 11, a congestion degree estimation unit 12, a target congestion degree determination unit 13, and a transmit data volume determination unit 14.

The communication quality acquisition unit 11 is a part acquiring a communication quality of a network. The congestion degree estimation unit 12 is a part estimating a congestion degree of the network. The target congestion degree determination unit 13 is a part determining a target congestion degree being a target of the congestion degree, based on the communication quality. The transmit data volume determination unit 14 is a part determining a transmit data volume, based on the congestion degree and the target congestion degree.

By thus configuring the transmit data volume control device 10, the transmit data volume control device 10 determines a target congestion degree being a target of a congestion degree, based on a communication quality, and determines a transmit data volume, based on the congestion degree and the target congestion degree. Consequently, a target congestion degree can be determined based on a communication quality, and a transmit data volume can be determined based on the communication quality, even in a network with a large amount of variation in the communication quality, such as a mobile communication network. Accordingly, a transmit data volume can be controlled within a proper range depending on variations in a communication environment, deterioration in utilization efficiency of a transmission bandwidth can be suppressed, and user perceived quality can be improved.

Next, FIG. 2 illustrates an operation example of the transmit data volume control device 10 according to the present example embodiment.

First, the communication quality acquisition unit 11 in the transmit data volume control device 10 acquires a communication quality of a network (Step S101). Further, the congestion degree estimation unit 12 estimates a congestion degree of the network (Step S102). The target congestion degree determination unit 13 determines a target congestion degree being a target of the congestion degree, based on the communication quality (Step S103). Then, the transmit data volume determination unit 14 determines a transmit data volume, based on the congestion degree and the target congestion degree (Step S104).

By thus operating the transmit data volume control device 10, a transmit data volume can be controlled within a proper range depending on variations in a communication environment, deterioration in utilization efficiency of a transmission bandwidth can be suppressed, and user perceived quality can be improved.

As described above, the first example embodiment of the present invention determines a target congestion degree being a target of a congestion degree, based on a communication quality, and determines a transmit data volume, based on the congestion degree and the target congestion degree. Consequently, the target congestion degree can be determined based on the communication quality, and the transmit data volume can be determined based on the communication quality. Accordingly, the transmit data volume can be controlled within a proper range depending on variations in a communication environment, deterioration in utilization efficiency of a transmission bandwidth can be suppressed, and user perceived quality can be improved.

Second Example Embodiment

Next, a second example embodiment of the present invention will be described. The transmit data volume control device according to the first example embodiment will be more specifically described in the present example embodiment.

FIG. 3 illustrates a configuration example of of a transmit data volume control system using a transmit data volume control device 20 according to the present example embodiment.

The transmit data volume control device 20 is a data transmission device transmitting requested data to a data reception device 60 by establishing a connection such as one based on TCP. For example, a personal computer (PC) and a mobile terminal fall under the category.

For example, the transmit data volume control device 20 may be configured as an origin server holding data requested by a user. Further, for example, the transmit data volume control device 20 may be configured as a relay server device installed in a mobile network and intermediately terminating a data communication between the origin server and the data reception device 60, such as a cache server, a proxy server, or an edge server.

The transmit data volume control device 20 may be placed on a path through which the origin server transmits data to the data reception device 60. In that case, a separate network, the origin server, or the like may be placed behind the transmit data volume control device 20 viewed from the data reception device 60.

The data reception device 60 transmits a data request to, receives a data packet from, and transmits an acknowledgement (ACK) packet to the transmit data volume control device 20 through a network. Then, when requested data are delivered from the transmit data volume control device 20 or the origin server, the data reception device 60 presents a user with the delivered data.

FIG. 4 is a diagram illustrating a configuration example of the transmit data volume control device 20 according to the present example embodiment. In FIG. 4, a data transmission-reception unit 25 is added to the transmit data volume control device 10 (FIG. 1).

First, a communication quality acquisition unit 11 will be described. The communication quality acquisition unit 11 is a part acquiring a communication quality of a network between the transmit data volume control device 20 and the data reception device 60. The description of the present example embodiment hereinafter assumes that the network refers to a transmission line between the transmit data volume control device 20 and the data reception device 60. The communication quality acquisition unit 11 acquires a communication quality used by any one or more of a congestion degree estimation unit 12, a target congestion degree determination unit 13, a transmit data volume determination unit 14, and the data transmission-reception unit 25 in subsequent stages.

Specific examples of communication qualities are listed below. The communication quality acquisition unit 11 acquires any one or more of the following information types:

A round trip time (RTT) in communication between the transmit data volume control device 20 and the data reception device 60, A time when an ACK packet is received, A reception time interval of ACK packets (a difference value between reception times of the last and current ACK packets), A data volume newly becoming acknowledged by an ACK packet, A data volume in flight (a data volume of a data packet of which is transmitted and not acknowledged by an ACK packet), and A maximum segment size (MSS).

Further, the communication quality acquisition unit 11 may store observed values of the aforementioned information types in a certain past period and acquire one or more information types of a cumulative total value, an average value, a variance, a standard deviation, a maximum value, a minimum value, and a difference value between a maximum value and a minimum value of the observed values. Further, the communication quality acquisition unit 11 may acquire information obtained by applying statistical processing such as a filtering technique of eliminating influence of momentary variation or exponential moving averaging to the aforementioned information.

Further, the communication quality acquisition unit 11 may acquire one or more information types that can be acquired or calculated with an ACK packet as exemplified below:

A receive window size (RWIN),

A duplicate ACK suggesting a loss or an incorrect order of data packets,

An incidence rate of a data packet loss (packet loss rate), and

An explicit congestion notification (ECN) message.

Next, the congestion degree estimation unit 12 will be described. The congestion degree estimation unit 12 is a part estimating a congestion degree of the network between the transmit data volume control device 20 and the data reception device 60.

Any indicator may be used as a congestion degree as long as the indicator allows for estimation of magnitude of network congestion. For example, a network may be determined to be more congested as a retained data volume related to data transmitted by the transmit data volume control device 20 increases, the data being retained in network equipment constituting the network. Accordingly, the retained data volume related to data transmitted by the transmit data volume control device 20 may be used as a congestion degree. A case of using a retained data volume as a congestion degree will be hereinafter described in the present example embodiment.

Figure 5:
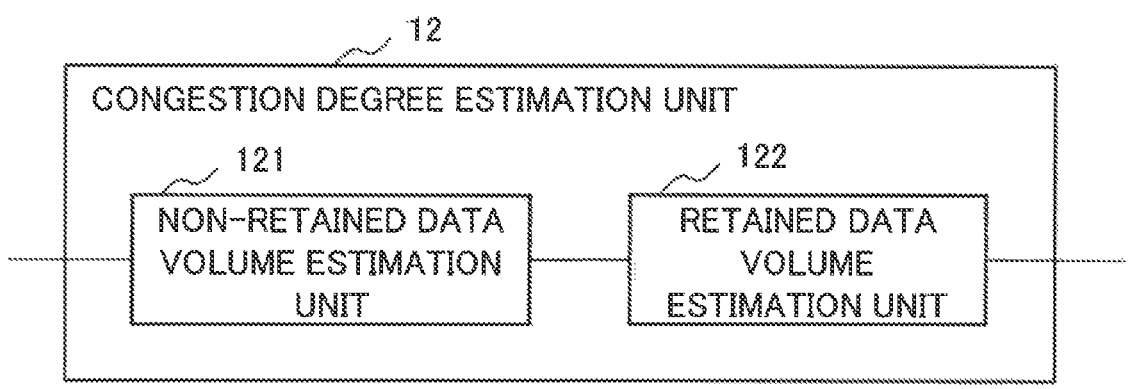
FIG. 5 shows a diagram illustrating a configuration example of a congestion degree estimation unit in the transmit data volume control device according to the second example embodiment of the present invention.

FIG. 5 illustrates a configuration example of the congestion degree estimation unit 12 when a retained data volume is used as a congestion degree. The congestion degree estimation unit 12 includes a non-retained data volume estimation unit 121 and a retained data volume estimation unit 122.

The non-retained data volume estimation unit 121 is a part estimating a non-retained data volume. The non-retained data are data being transmitted in the network without being retained in a buffer existing in network equipment constituting the network, such as a router, a switch, a gateway device, or a base station device.

Next an example of an estimation method of a non-retained data volume will be described.

For example, the non-retained data volume estimation unit 121 estimates a non-retained data volume by calculating a product of an estimate of a wireless bandwidth (bandwidth estimate) and an estimate of a propagation delay time (delay estimate).

Figure 6:
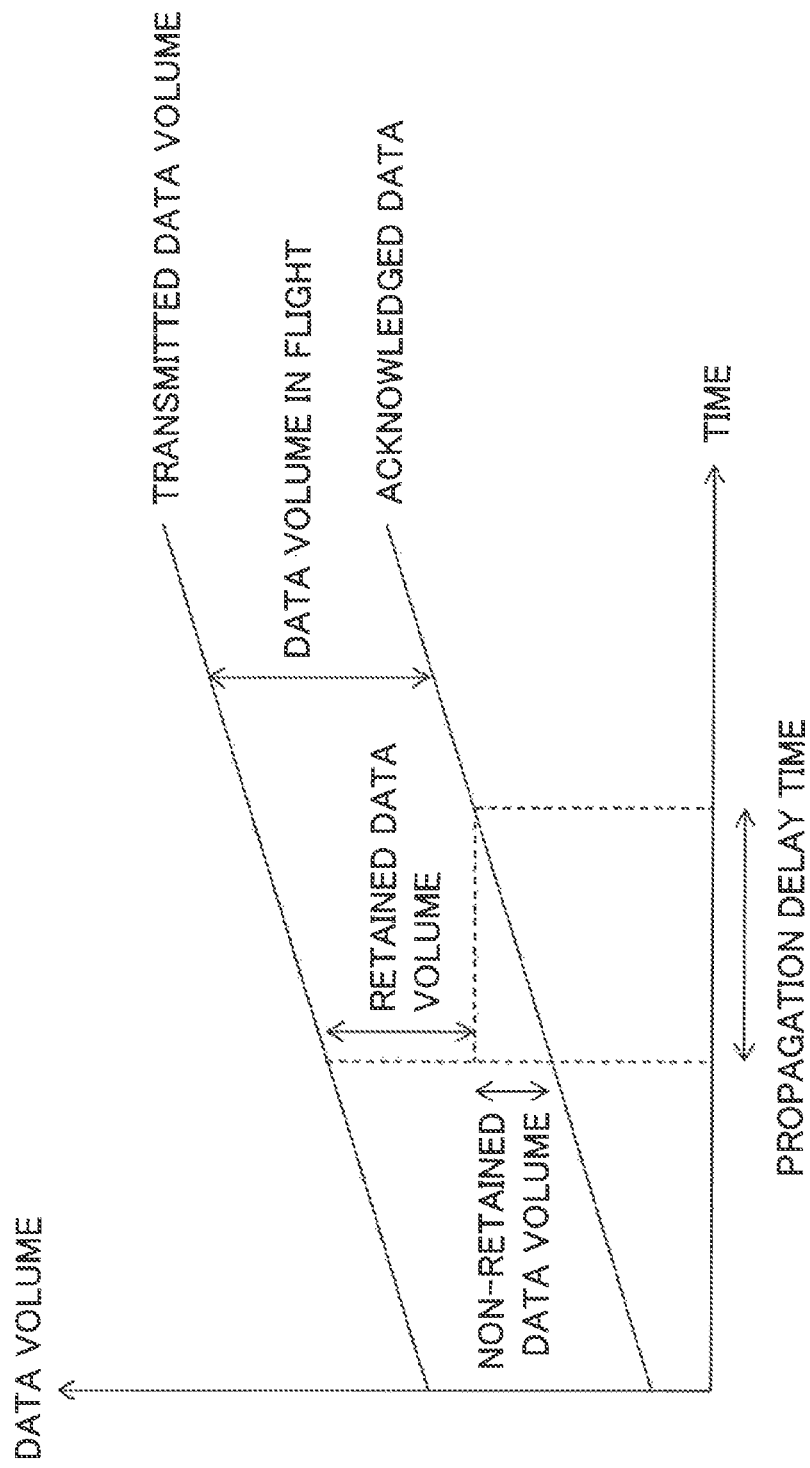
FIG. 6 shows a diagram illustrating a congestion degree estimation method in the transmit data volume control device according to the second example embodiment of the present invention.

FIG. 6 illustrates an example of a relation among respective data volumes. A transmitted data volume is a data volume transmitted to the data reception device 60 by the transmit data volume control device 20. An acknowledged data volume is a data volume being acknowledged by an ACK packet received from the data reception device 60. Then, a value obtained by subtracting the acknowledged data volume from the transmitted data volume is a data volume in flight. In other words, the data volume in flight is a data volume of data which are transmitted from the transmit data volume control device 20 but an ACK packet for which is not yet received.

Data in flight may be classified into retained data that are retained in network equipment and non-retained data that are not being retained but are being transmitted. The non-retained data are being transmitted and therefore an ACK packet for which may be considered to be received by the end of a propagation delay time. Accordingly, the non-retained data volume estimation unit 121 according to the present example embodiment estimates as a non-retained data volume a data volume to be acknowledged by the end of the propagation delay time, that is, a product of an estimate of a wireless bandwidth and an estimate of the propagation delay.

The wireless bandwidth is a transmitted data volume per unit time. Specifically, the wireless bandwidth may be estimated by dividing a data volume becoming acknowledged in a predetermined period by an elapsed time required for receiving the data (reception time interval). The predetermined period may be a predetermined interval or a number of received ACK packets.

For example, the data volume becoming acknowledged in the predetermined period may be estimated by calculating a data volume newly becoming acknowledged by ACK packets received by the data transmission-reception unit 25 in the predetermined period. Further, a value obtained by applying statistical processing such as exponential moving averaging to the data volume may be used as an acknowledged data volume.

For example, the reception time interval may be obtained by subtracting a reception time of the earliest ACK packet out of ACK packets received by the data transmission-reception unit 25 in the predetermined period from a reception time of the latest ACK packet. Further, a value obtained by applying statistical processing such as exponential moving averaging to the reception time interval may be used as a reception time interval.

The propagation delay time may be estimated by calculating a minimum value or an exponential moving average value of round trip times in communication between the transmit data volume control device 20 and the data reception device 60.

Further, the wireless bandwidth varies with changes in allocation of resource blocks in a base station device, variations in radio wave quality in a mobile network, and the like. Further, the propagation delay time varies with a delay related to retransmission due to a handover of a user terminal, the ARQ technology in the RLC layer, and the HARQ technology in the MAC layer, and the like. Accordingly, a filtering technique of eliminating influence of momentary variation may be applied to the aforementioned bandwidth estimate and/or delay estimate.

The retained data volume estimation unit 122 is a part calculating a retained data volume. Retained data are data retained in a buffer existing in network equipment constituting the network, such as a router, a switch, a gateway device, or a base station device.

For example, the retained data volume may be estimated by subtracting a non-retained data volume estimated by the non-retained data volume estimation unit 121 from a data volume in flight acquired by the communication quality acquisition unit 11.

Further, a congestion degree may be set as an increment of a data volume in flight in a certain past period, and the congestion degree may be estimated as a value obtained by subtracting a non-retained data volume from a data volume transmitted in the certain past period.

A method assuming a fixed network, such as the methods described in NPL 3 and PTL 2, does not consider drastic variations of a wireless bandwidth and a propagation delay, and therefore is not able to precisely estimate a congestion degree in a mobile network. Further, the method described in PTL 1 estimates a retained data volume (congestion degree), based on throughput of received data such as an amount of padding included in the received data. Consequently, the method is not able to estimate magnitude of the retained data volume in a transmission state not including padding. Accordingly, none of NPL 3, PTL 1, and PTL 2 is able to precisely estimate a congestion degree.

By contrast, the present example embodiment calculates a bandwidth estimate and a delay estimate, based on variations in a communication quality, and calculates a congestion degree, based on the estimates. Accordingly, a congestion degree can be precisely calculated depending on the variations in the communication quality.

Next, the target congestion degree determination unit 13 will be described. The target congestion degree determination unit 13 is a part determining a target congestion degree being a target of a congestion degree, based on a communication quality. The congestion degree uses an indicator based on a unit and a criterion that are identical to those used for a congestion degree estimated by the aforementioned congestion degree estimation unit 12. The target congestion degree is a congestion degree being a target when the transmit data volume determination unit 14 determines an upper limit of a transmit data volume.

For example, when a radio wave condition sharply improves and a transmissible data volume sharply increases, an excessively low retained data volume (congestion degree) in the network causes a state in which data to be transmitted do not exist in spite of readiness for transmission in terms of bandwidth. In other words, utilization efficiency of a transmission bandwidth deteriorates. In a case that some extent of congestion degree of the network exists, retained data may be transmitted even when a transmissible data volume sharply increases, and therefore an incidence of effective use of a transmission bandwidth being inhibited, that is, an incidence of data to be transmitted not existing in spite of readiness for transmission, can be reduced. On the other hand, an excessively high congestion degree of the network reduces perceived quality by delayed data arrival at the data reception device and a delayed start of another communication session. Accordingly, determining a proper target congestion degree, based on an amount of variation in a communication quality, enables suppression of deterioration in utilization efficiency of the transmission bandwidth and improvement in user perceived quality.

More specifically, when stability of a communication quality is low, that is, when an amount of variation in the communication quality is large, a target congestion degree of the network is raised depending on the amount of variation in the communication quality. Consequently, the congestion degree of the network increases, and even when a transmissible data volume sharply increases, exhaustion of transmit data can be suppressed, and the transmission bandwidth can be more effectively used. When the amount of variation in the communication quality is large, an amount of variation in delay also increases. Accordingly, by permitting some extent of delay and raising the congestion degree, the transmission bandwidth can be more effectively used, and more data can be transmitted. Further, when the stability of the communication quality is high, that is, when the amount of variation in the communication quality is small, the target congestion degree of the network is lowered depending on the amount of variation in the communication quality. Consequently, the congestion degree of the network decreases, and data delay can be reduced. Accordingly, by increasing the target congestion degree as the amount of variation in the communication quality increases, deterioration in utilization efficiency of the transmission bandwidth can be suppressed, and user perceived quality can be improved.

Examples of a determination method of a target congestion degree will be cited below. As described above, the present example embodiment increases a target congestion degree as an amount of variation in a communication quality increases.

For example, a variance, a standard deviation, or a difference between a maximum value and a minimum value of congestion degrees estimated by the congestion degree estimation unit 12 in a certain past period may be set as an amount of variation, and a product of the amount of variation and a predetermined coefficient may be set as a target congestion degree. Thus, the amount of variation in the communication quality may be quantified as an indicator, and the target congestion degree may be increased depending on increase in the amount of variation.

Further, the amount of variation may be calculated by excluding an abnormal value (significantly deviating value) from congestion degree values estimated by the congestion degree estimation unit 12 in a certain past period through existing statistical processing and then calculating a variance, a standard deviation, or a difference between a maximum value and a minimum value. Further, the target congestion degree may be calculated based on a value obtained by calculating an exponential moving average of amounts of variation calculated a plurality of times.

Further, a variance, a standard deviation, or a difference between a maximum value and a minimum value of reception intervals of ACK packets in a certain past period may be set as an amount of variation. For example, a target congestion degree may be determined in accordance with a predetermined weakly monotonic increasing function starting from a predetermined initial value, and increasing an increment of the target congestion degree as an amount of variation increases and decreasing the increment of the target congestion degree (the target congestion degree may be decreased) as the amount of variation decreases. Thus, the target congestion degree can be determined based on the amount of variation of the reception intervals of ACK packets.

Further, an amount of variation in a congestion degree may be calculated by analyzing a stability level of a temporal change in the congestion degree from a trend or a correlation among a plurality of congestion degrees in a certain past period, and a target congestion degree may be determined based on the stability level (amount of variation). For example, the target congestion degree may be determined in accordance with a predetermined weakly monotonic decreasing function decreasing the target congestion degree as the stability level increases (the amount of variation decreases) and increasing the target congestion degree as the stability level decreases (the amount of variation increases). Further, for example, the stability level may be calculated in accordance with an existing stationarity test method such as a unit root test, a cointegration test, and autocovariance analysis.

Further, a target congestion degree may be determined based on a communication quality such as an RTT or a packet loss rate, instead of an amount of variation in a communication quality. For example, a target congestion degree may be determined in accordance with a predetermined weakly monotonic decreasing function starting from a predetermined initial value, and decreasing an increment of the target congestion degree (the target congestion degree may be decreased) as an RTT or a packet loss rate increases and increasing the increment of the target congestion degree as the RTT or the packet loss rate decreases. When the delay or the packet loss rate is large, the method assumes that reduction in perceived quality is likely to occur and decreases the target congestion degree. Accordingly, user perceived quality can be improved.

Next, the transmit data volume determination unit 14 will be described. The transmit data volume determination unit 14 is a part determining a transmit data volume, based on a congestion degree and a target congestion degree.

For example, an upper limit of a transmit data volume, such as a congestion window size (cwnd) may be set as the transmit data volume. Further, the upper limit may be a set value of a transmit buffer size (SO_SNDBUF) in a communication connection, a memory size available to communication (tcp_wmem), the size being set as a system parameter, or a receive window size (RWIN) notified of by an ACK packet. A case of determining as a transmit data volume an upper limit of the transmit data volume will be hereinafter described.

Examples of a determination method of a transmit data volume will be cited below. A congestion degree of the network increases as a transmit data volume increases. Accordingly, the congestion degree can be brought closer to a target congestion degree by increasing the transmit data volume when the congestion degree is less than the target congestion degree and decreasing the transmit data volume when the congestion degree is greater than the target congestion degree.

For example, a value obtained by multiplying a predetermined coefficient by (or exponentiating by a predetermined exponent) a value obtained by subtracting a congestion degree from a target congestion degree and adding the multiplied value to a current upper limit is determined to be a new upper limit. Thus, an upper limit of the transmit data volume can be decreased when the congestion degree is greater than the target congestion degree, and the upper limit can be increased when the congestion degree is less than the target congestion degree.

Further, a value obtained by multiplying a predetermined coefficient by a sum total of one or more past histories of a value obtained by subtracting a congestion degree from a target congestion degree and adding the multiplied value to a current upper limit may be set as a new upper limit. Further, a value obtained by calculating a unit variation per unit number of calculations or per unit time of a value obtained by subtracting a congestion degree from a target congestion degree between the latest value and a past value preceding by a predetermined number of calculations or a predetermined time, multiplying the calculated value by a predetermined coefficient, and adding the multiplied value to a current upper limit may be set as a new upper limit. Further, a new upper limit may be determined by combining two or more of the aforementioned upper limit determination methods.

Further, for example, when an upper limit is a cwnd, the determination method may be combined with an existing increasing/decreasing method of a cwnd in TCP such as CUBIC TCP (NPL 1) or TCP NewReno (NPL 2). For example, a function may be added to an existing increasing/decreasing method, the function making an adjustment in such a way to decrease a decrement of a cwnd or increase an increment of the cwnd as a value obtained by subtracting a congestion degree from a target congestion degree or dividing the target congestion degree by the congestion degree becomes greater. Thus, the congestion degree can be more rapidly brought closer to the target congestion degree.

Next, the data transmission-reception unit 25 will be described. The data transmission-reception unit 25 is a part transmitting and receiving data, based on a transmit data volume (amount of transmissible data packets) determined by the transmit data volume determination unit 14. The data transmission-reception unit 25 transmits a data packet to the data reception device 60 and receives a confirmatory response (ACK) packet, through the network.

By thus configuring the transmit data volume control device 20, the transmit data volume control device 20 determines a target congestion degree being a target of a congestion degree, based on a communication quality, and determines a transmit data volume, based on the congestion degree and the target congestion degree. Consequently, a target congestion degree can be determined based on a communication quality, and a transmit data volume can be determined based on the communication quality, even in a network with a large amount of variation in the communication quality, such as a mobile communication network. Accordingly, a transmit data volume can be controlled within a proper range depending on variations in a communication environment, deterioration in utilization efficiency of a transmission bandwidth can be suppressed, and user perceived quality can be improved.

Figure 7:
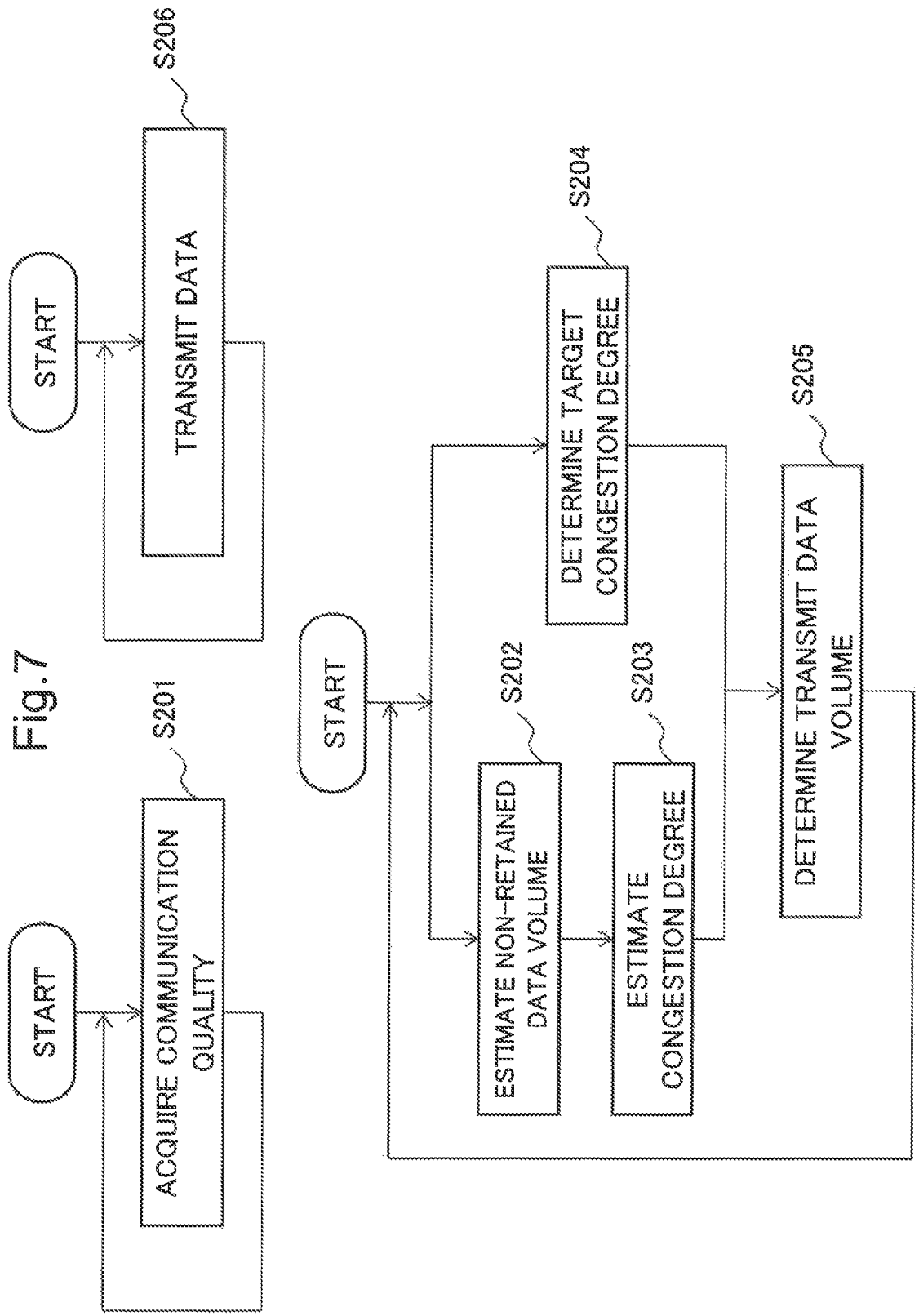
FIG. 7 shows a diagram illustrating an operation example of the transmit data volume control device according to the second example embodiment of the present invention.

Next, FIG. 7 illustrates an operation example of the transmit data volume control device 20 according to the present example embodiment. Steps S201 to S205 in FIG. 7 correspond to Steps S101 to S104 in FIG. 1.

First, the communication quality acquisition unit 11 acquires a communication quality of the network when the data transmission-reception unit 25 receives an ACK packet from the data reception device 60 or at every certain time (Step S201). For example, the communication quality acquisition unit 11 acquires communication qualities as follows:

A round trip time,
A reception time of an ACK packet,
A reception time interval of ACK packets,
A data volume newly becoming acknowledged by an ACK packet, and
A data volume in flight.

The non-retained data volume estimation unit 121 in the congestion degree estimation unit 12 estimates a non-retained data volume, based on the communication quality, when the data transmission-reception unit 25 receives an ACK packet from the data reception device 60 or at every certain time (Step S202). Then, the retained data volume estimation unit 122 calculates a retained data volume and estimates a congestion degree (Step S203).

For example, first, a bandwidth estimate is calculated by dividing a data volume acknowledged by an ACK packet received in a predetermined period by a time required for reception of the ACK packet. Further, a delay estimate is calculated by calculating a minimum value or an exponential moving average value of round trip times. Next, a non-retained data volume is calculated by multiplying the bandwidth estimate by the delay estimate. Then, an estimate of a congestion degree (retained data volume) is calculated by subtracting the non-retained data volume from a data volume in flight.

Further, the target congestion degree determination unit 13 determines a target congestion degree, based on the communication quality, when the data transmission-reception unit 25 receives an ACK packet from the data reception device 60 or at every certain time (Step S204).

For example, a value obtained by multiplying a predetermined coefficient by a variance, a standard deviation, or a difference between a maximum value and a minimum value of congestion degrees estimated by the congestion degree estimation unit 12 in a certain past period is set as a target congestion degree. Thus, an amount of variation in the communication quality can be quantified as an indicator, and the target congestion degree can be increased with increase in the amount of variation.

Then, the transmit data volume determination unit 14 determines a transmit data volume, based on the congestion degree and the target congestion degree, when the congestion degree estimation unit 12 estimates the congestion degree or at every certain time (Step S205).

For example, a value obtained by multiplying a predetermined coefficient by a value obtained by subtracting a congestion degree from a target congestion degree and adding the multiplied value to an upper limit of a current transmit data volume is determined to be a new upper limit. Thus, the congestion degree can be brought closer to the target congestion degree by decreasing the upper limit of the transmit data volume when the congestion degree is greater than the target congestion degree and increasing the upper limit when the congestion degree is less than the target congestion degree.

When receiving a data request message from the data reception device 60, the data transmission-reception unit 25 transmits a packet including the requested data to the data reception device 60, based on the transmit data volume determined by the transmit data volume determination unit 14 (Step S206).

When the transmit data volume control device 20 is an origin server, the server holds all original data, and therefore the data transmission-reception unit 25 is able to transmit data, based on the transmit data volume determined by the transmit data volume determination unit 14. When the transmit data volume control device 20 is a relay server device, it is preferable to prestore original data as a cache in an internal storage area or temporarily store a data stream received from an origin server in a buffer. Thus, the data transmission-reception unit 25 is able to transmit data, based on the transmit data volume determined by the transmit data volume determination unit 14, without depending on throughput of the network between the origin server and the transmit data volume control device 20.

When a user makes a data acquisition request, the data reception device 60 transmits a request for the data to the transmit data volume control device 20 or an origin server through the network. Further, when receiving a data packet from the data transmission-reception unit 25 in the transmit data volume control device 20, the data reception device 60 transmits an ACK packet related to the data packet to the data transmission-reception unit 25.

By thus operating the transmit data volume control device 20, the transmit data volume control device 20 determines a target congestion degree being a target of a congestion degree, based on a communication quality, and determines a transmit data volume, based on the congestion degree and the target congestion degree. Accordingly, a transmit data volume can be controlled within a proper range depending on variations in a communication environment, deterioration in utilization efficiency of a transmission bandwidth can be suppressed, and user perceived quality can be improved.

The description above assumes that a transport layer protocol is TCP. However, the transmit data volume control device according to the present example embodiment is also applicable to a transmit data volume control device controlling a transmit data volume by using a protocol other than TCP, such as UDP, and emulating behavior of TCP in the transport layer or an upper layer.

As described above, similarly to the first example embodiment, the second example embodiment of the present invention determines a target congestion degree being a target of a congestion degree, based on a communication quality, and determines a transmit data volume, based on the congestion degree and the target congestion degree. Consequently, the target congestion degree can be determined based on the communication quality, and the transmit data volume can be determined based on the communication quality. Accordingly, the transmit data volume can be controlled within a proper range depending on variations in a communication environment, deterioration in utilization efficiency of a transmission bandwidth can be suppressed, and user perceived quality can be improved.

Further, the present example embodiment calculates a non-retained data volume, based on a bandwidth estimate and a delay estimate, and calculates a congestion degree, based on the estimates. Accordingly, the congestion degree can be precisely calculated even in a mobile network, taking into account influence of bandwidth variations and delay variations.

Third Example Embodiment

Next, a third example embodiment of the present invention will be described. The present example embodiment is an example embodiment obtained by adding to the second example embodiment a configuration receiving communication quality information from network equipment.

Figure 8:
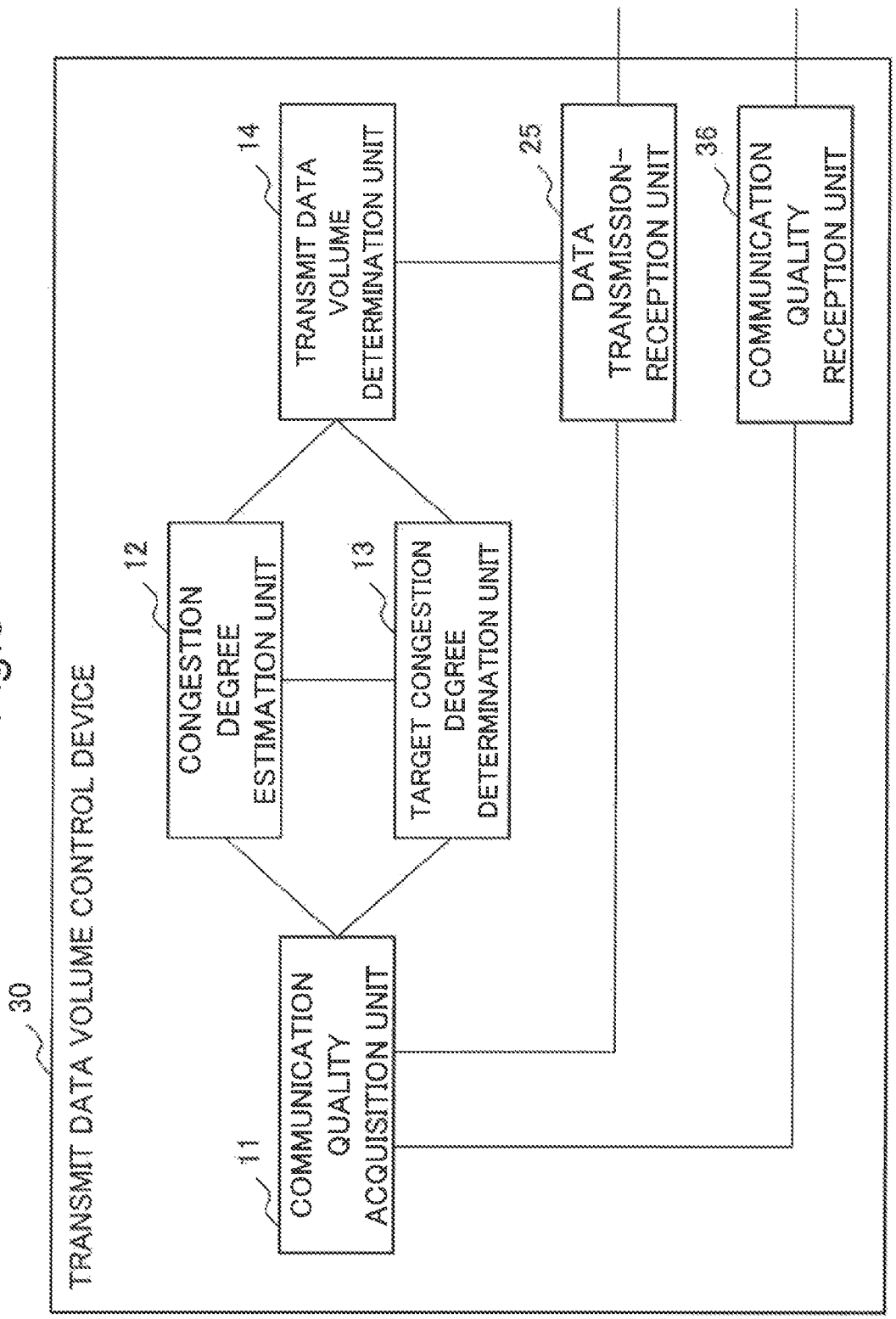
FIG. 8 shows a diagram illustrating a configuration example of a transmit data volume control device according to a third example embodiment of the present invention.

FIG. 8 illustrates a configuration example of a transmit data volume control device 30 according to the present example embodiment. The transmit data volume control device 30 has a configuration obtained by adding a communication quality reception unit 36 to the transmit data volume control device 20 according to the second example embodiment.

Figure 9:
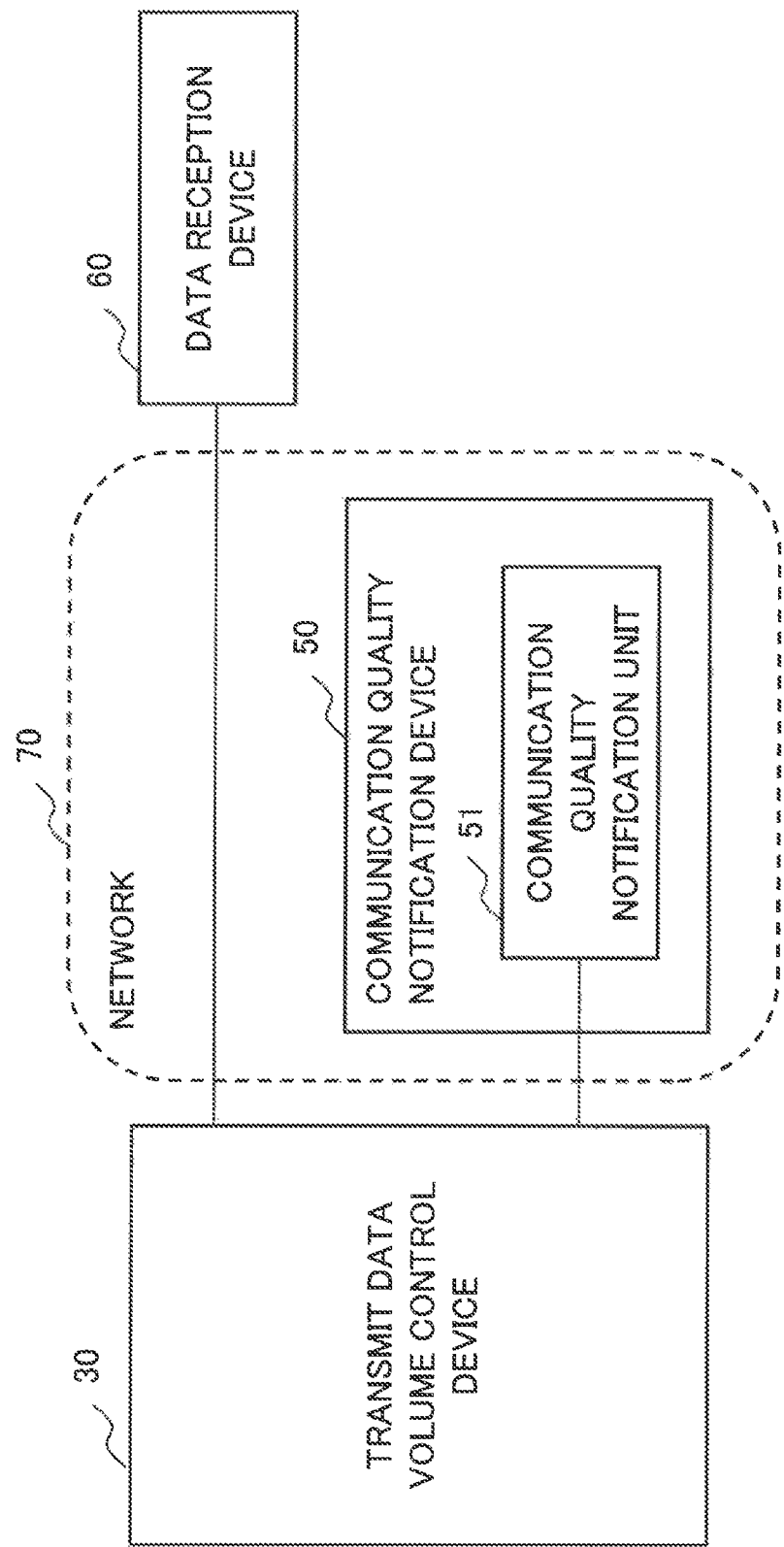
FIG. 9 shows a diagram illustrating a configuration example of a transmit data volume control system according to the third example embodiment of the present invention.

Further, FIG. 9 illustrates an example of a transmit data volume control system using the transmit data volume control device 30 according to the present example embodiment. The transmit data volume control device 30 and a data reception device 60 communicate through a network 70. Further, the network 70 includes a communication quality notification device 50.

The communication quality notification device 50 is network equipment constituting the network 70. For example, a router, a switch, a gateway device performing encapsulation and encryption, base station devices in a mobile network, such as a NodeB and an eNodeB, and the like fall under the category. The gateway devices include a serving GPRS support node (SGSN)/serving gateway (S-GW), a gateway GPRS support node (GGSN)/packet data network gateway (P-GW), an evolved packet core gateway, and a security gateway.

A communication quality notification unit 51 in the communication quality notification device 50 is a part acquiring a communication quality of the network and notifying the communication quality reception unit 36 in the transmit data volume control device 30 of communication quality information. Further, the communication quality reception unit 36 in the transmit data volume control device 30 is a part receiving communication quality information from the communication quality notification unit 51 in the communication quality notification device 50.

Then, a communication quality acquisition unit 11 acquires a communication quality from communication quality information received by the communication quality reception unit 36, in addition to acquiring a communication quality of the network, similarly to the second example embodiment. Further, a congestion degree estimation unit 12 estimates a congestion degree of the network, based on a communication quality acquired by the communication quality acquisition unit 11.

For example, a communication quality acquired by the communication quality notification unit 51 is a data volume actually retained in a buffer existing in the communication quality notification device 50 (actual retained data volume). Further, an actual retained data volume for each of a plurality of data reception devices 60 obtained by measuring an actual retained data volume for each data reception device 60 may be acquired as a communication quality.

Further, the communication quality may be an indicator of a radio wave state such as a signal to interference plus noise ratio (SINR), a channel quality indicator (CQI), a received signal strength indicator (RSSI), or an arbitrary strength unit (ASU). Further, the communication quality may be transmission throughput for each data reception device 60 or in every communication session passing through the communication quality notification device 50, or a statistic thereof. Further, the communication quality may be an amount of wireless radio wave resource usage for each data reception device 60 or in every communication session passing through the communication quality notification device 50, or a statistic thereof. Further, the communication quality may be an execution history of a code modulation system for each data reception device 60 or in every communication session passing through the communication quality notification device 50. Further, the communication quality may be a number of active users communicating with the communication quality notification device 50 or a number of communication sessions.

Next, an example of a notification method of communication quality information will be described. For example, the communication quality notification device 50 can notify the transmit data volume control device 30 of communication quality information by use of a communication session for transmission and reception of a data packet and an ACK packet, the session being established between the transmit data volume control device 30 and the data reception device 60. Specifically, when an ACK packet transmitted from the data reception device 60 to the transmit data volume control device 30 passes through the communication quality notification device 50, the communication quality notification unit 51 embeds communication quality information into a header of the ACK packet. Then, when the data transmission-reception unit 25 receives the ACK packet, the communication quality reception unit 36 acquires the communication quality information from the header of the ACK packet.

Further, for example, the notification method of communication quality information may be a method of using a communication session different from a communication session established between the transmit data volume control device 30 and the data reception device 60. Specifically, a notification session for notifying of communication quality information is newly established between the communication quality notification unit 51 and the communication quality reception unit 36. Then, the communication quality notification unit 51 notifies the communication quality reception unit 36 of communication quality information by use of the notification session. Further, the communication quality reception unit 36 determines to which of one or more communication sessions the received communication quality information is related.

Next, an example of an estimation method of a congestion degree will be described. For example, the congestion degree estimation unit 12 may set as a congestion degree an actual retained data volume for each data reception device 60 or in every communication session passing through the communication quality notification device 50, the actual retained data volume being acquired by the communication quality acquisition unit 11. Thus, an actual retained data volume can be set as a congestion degree, and therefore the congestion degree can be more precisely estimated.

Further, the congestion degree estimation unit 12 may set as a congestion degree a value obtained by adding an increment of a data volume in flight (a negative value when the data volume in flight decreases) acquired by the communication quality acquisition unit 11 from a time point of a previous estimation of a congestion degree to an actual retained data volume at the time point of the previous estimation of the congestion degree. Thus, a retained data volume can be estimated even when communication quality information is lost due to some factor or when the actual retained data volume is not updated from the time point of the previous estimation of the congestion degree due to a reception frequency of the communication quality information being less than an estimation frequency of the congestion degree.

By thus configuring the transmit data volume control device 30, the transmit data volume control device 30 determines a target congestion degree being a target of a congestion degree, based on a communication quality, and determines a transmit data volume, based on the congestion degree and the target congestion degree. Consequently, the target congestion degree can be determined based on the communication quality, and the transmit data volume can be determined based on the communication quality, even in a network with a large amount of variation in the communication quality, such as a mobile communication network. Accordingly, a transmit data volume can be controlled within a proper range depending on variations in a communication environment, deterioration in utilization efficiency of a transmission bandwidth can be suppressed, and user perceived quality can be improved.

Further, the transmit data volume control device according to the present example embodiment receives communication quality information, such as an actual retained data volume, from the communication quality notification device. Accordingly, a retained data volume can be more precisely estimated, compared with a method of estimating a retained data volume by estimating a non-retained data volume. Consequently, a congestion degree can be more precisely estimated, and a transmit data volume can be more properly determined.

Figure 10:
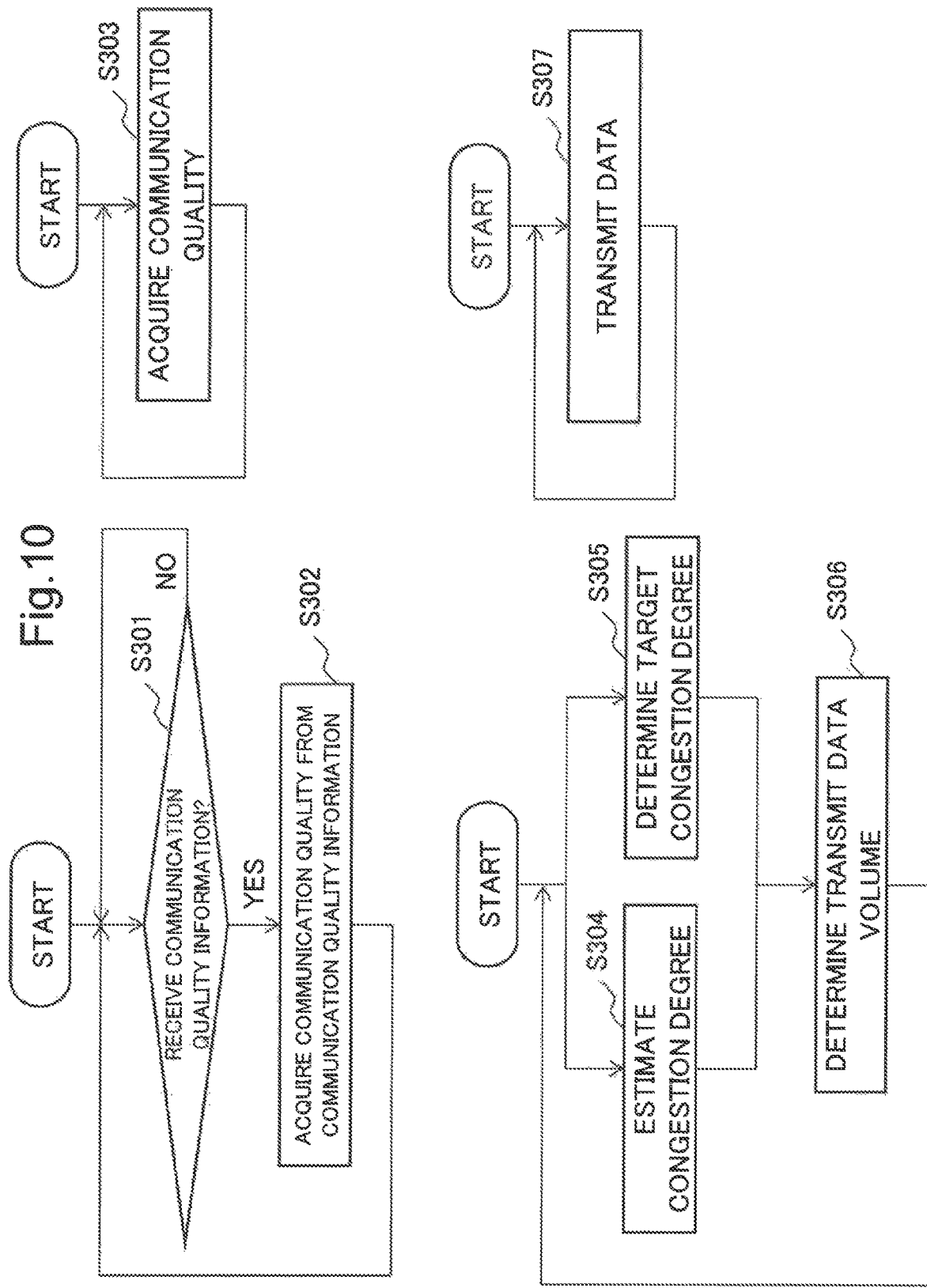
FIG. 10 shows a diagram illustrating an operation example of the transmit data volume control device according to the third example embodiment of the present invention.

Next, FIG. 10 illustrates an operation example of the transmit data volume control device 30. FIG. 10 differs from FIG. 7 in that Steps S301 and S302 are added, and Step S202 in FIG. 7 is deleted.

The communication quality notification unit 51 in the communication quality notification device 50 acquires a communication quality acquirable to the communication quality notification unit 51. Then, the communication quality notification unit 51 notifies the communication quality reception unit 36 in the transmit data volume control device 30 of communication quality information when the communication quality is changed by input and output of a data packet, a move of a user terminal, a lapse of time, or the like, or at every certain time. For example, the communication quality notification unit 51 acquires a data volume actually retained in a buffer existing in the communication quality notification device 50 (actual retained data volume) as a communication quality and notifies the communication quality reception unit 36 of communication quality information.

Then, when the communication quality reception unit 36 in the transmit data volume control device 30 receives the communication quality information (Step S301), the communication quality acquisition unit 11 acquires the communication quality from the received communication quality information (Step S302). For example, the communication quality acquisition unit 11 acquires an actual retained data volume. When a plurality of communication quality notification devices 50 exist in the network 70, the communication quality acquisition unit 11 receives communication quality information from each communication quality notification device 50 and acquires each actual retained data volume.

Further, communication quality acquisition unit 11 acquires a communication quality of the network when the data transmission-reception unit 25 receives an ACK packet from the data reception device 60 or at every certain time (Step S303). When every communication quality required by the congestion degree estimation unit 12, the target congestion degree determination unit 13, and the transmit data volume determination unit 14 is included in communication quality information received from the communication quality notification device 50, the operation in this step is not required.

The congestion degree estimation unit 12 estimates a congestion degree of the network, based on the communication quality acquired by the communication quality acquisition unit 11, when the data transmission-reception unit 25 receives an ACK packet from the data reception device 60 or at every certain time (Step S304). For example, the congestion degree estimation unit 12 sets as a congestion degree an actual retained data volume acquired by the communication quality acquisition unit 11. When a plurality of communication quality notification devices 50 exist, a total of acquired actual retained data volumes is set as a congestion degree.

Further, the target congestion degree determination unit 13 determines a target congestion degree, based on an amount of variation in the communication quality, when the data transmission-reception unit 25 receives an ACK packet from the data reception device 60 or at every certain time (Step S305). For example, the target congestion degree determination unit 13 sets as a target congestion degree a value obtained by multiplying a predetermined coefficient by a variance, a standard deviation, or a difference between a maximum value and a minimum value of congestion degrees estimated by the congestion degree estimation unit 12 in a certain past period.

Then, the transmit data volume determination unit 14 determines a transmit data volume, based on the congestion degree and the target congestion degree, when the congestion degree estimation unit 12 estimates the congestion degree or at every certain time (Step S306). For example, the transmit data volume determination unit 14 determines a value obtained by multiplying a predetermined coefficient by a value obtained by subtracting the congestion degree from the target congestion degree and adding the multiplied value to an upper limit of a current transmit data volume to be an upper limit of a new transmit data volume.

When receiving a data request message from the data reception device 60, the data transmission-reception unit 25 transmits a packet including the requested data to the data reception device 60, based on the transmit data volume determined by the transmit data volume determination unit 14 (Step S307).

By thus operating the transmit data volume control device 30, the transmit data volume can be controlled within a proper range depending on variations in a communication environment, deterioration in utilization efficiency of a transmission bandwidth can be suppressed, and user perceived quality can be improved.

As described above, similarly to the first and second example embodiments, the third example embodiment of the present invention determines a target congestion degree being a target of a congestion degree, based on a communication quality, and determines a transmit data volume, based on the congestion degree and the target congestion degree. Accordingly, the transmit data volume can be controlled within a proper range depending on variations in a communication environment, deterioration in utilization efficiency of a transmission bandwidth can be suppressed, and user perceived quality can be improved.

Further, the transmit data volume control device according to the present example embodiment receives communication quality information, such as an actual retained data volume, from the communication quality notification device. Consequently, the congestion degree can be more precisely estimated, and the transmit data volume can be more properly determined.

Hardware Configuration Example

A configuration example of a hardware resource providing the transmit data volume control device (10, 20, 30) according to each of the aforementioned example embodiments of the present invention by use of a single information processing device (computer) will be described. The transmit data volume control device may be physically or functionally provided by use of at least two information processing devices. Further, the transmit data volume control device may be provided as a dedicated device. Further, only part of the functions of the transmit data volume control device may be provided by use of the information processing device.

Figure 11:
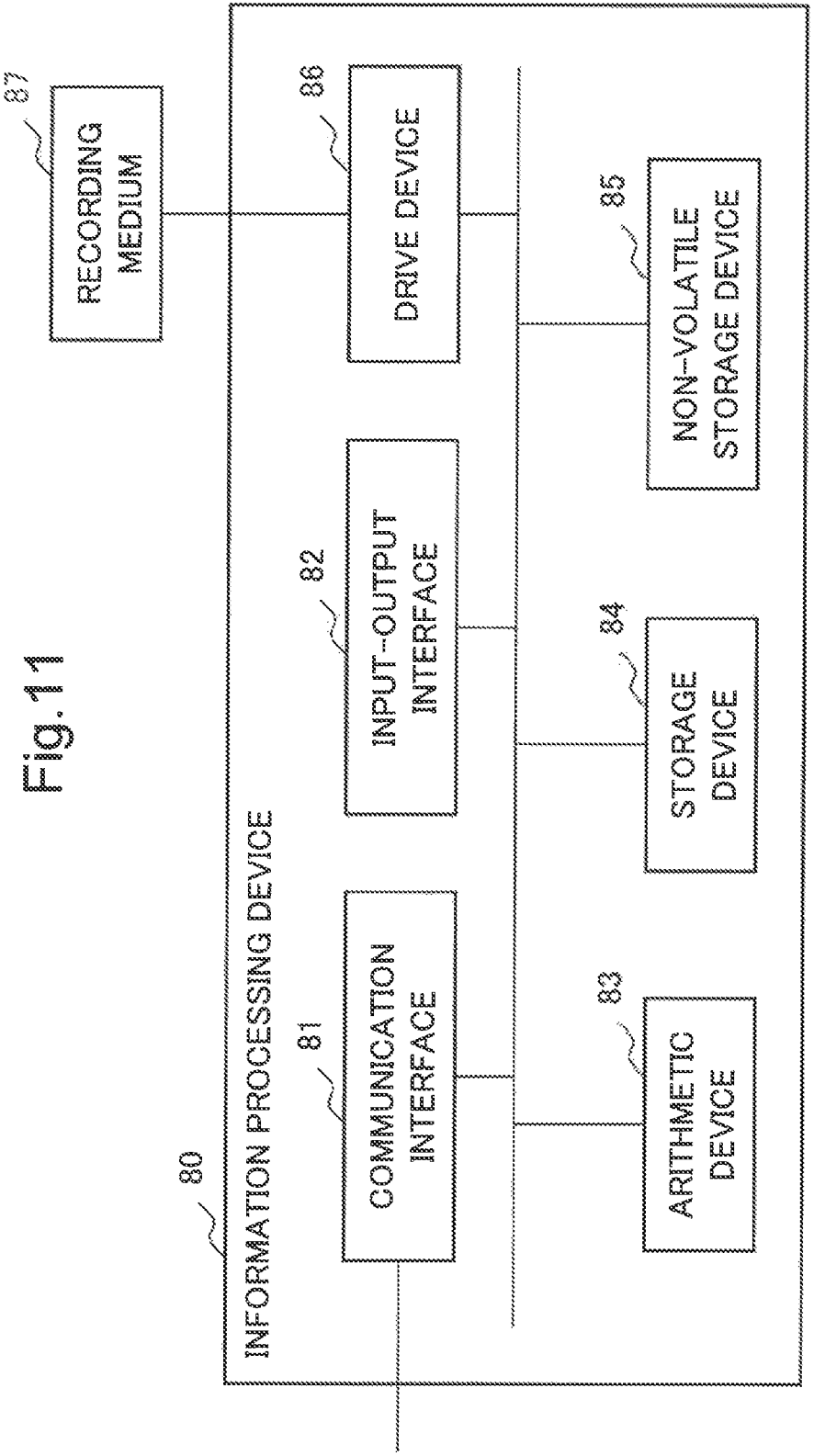
FIG. 11 shows a diagram illustrating a hardware configuration example of each example embodiment of the present invention.

FIG. 11 is a diagram conceptually illustrating a hardware configuration example of an information processing device capable of providing the transmit data volume control device according to each example embodiment of the present invention. The information processing device 80 includes a communication interface 81, an input-output interface 82, an arithmetic device 83, a storage device 84, a non-volatile storage device 85, and a drive device 86.

The communication interface 81 is a communication means for the transmit data volume control device according to each example embodiment to communicate with an external device in a wired and/or wireless manner. When the transmit data volume control device is provided by at least two information processing devices, the devices may be connected in a mutually communicable manner through the communication interface 81.

The input-output interface 82 is a man-machine interface such as a keyboard being an example of an input device or a display as an output device.

The arithmetic device 83 is an arithmetic processing device such as a general-purpose central processing unit (CPU) or a microprocessor. For example, the arithmetic device 83 is capable of reading various kinds of programs stored in the non-volatile storage device 85 into the storage device 84 and executing processing in accordance with the read programs.

The storage device 84 is a memory device such as a random access memory (RAM), is referenceable from the arithmetic device 83, and stores a program, various kinds of data, and the like. The storage device 84 may be a volatile memory device.

For example, the non-volatile storage device 85 is a non-volatile storage device such as a read only memory (ROM) or a flash memory, and is capable of storing various kinds of programs, data, and the like.

For example, the drive device 86 is a device processing reading and writing of data from and to a recording medium 87 to be described later.

For example, the recording medium 87 is any data-recordable recording medium such as an optical disk, a magneto-optical disk, or a semiconductor flash memory.

For example, each example embodiment of the present invention may be provided by configuring a transmit data volume control device with the information processing device 80 exemplified in FIG. 11 and supplying a program capable of providing the functions described in each of the aforementioned example embodiments to the transmit data volume control device.

In this case, an example embodiment may be provided by the arithmetic device 83 executing the program supplied to the transmit data volume control device. Further, not all but part of the functions of the transmit data volume control device may be configured by the information processing device 80.

Furthermore, the aforementioned program may be recorded in the recording medium 87 and may be appropriately stored into the non-volatile storage device 85 in a shipping stage, an operation stage, or the like of the transmit data volume control device. In this case, a supply method of the aforementioned program may employ a method of installation into the transmit data volume control device by use of a suitable jig in a manufacturing stage before shipping, an operation stage, or the like. Further, the supply method of the aforementioned program may employ a common procedure such as a method of external download through a communication line such as the Internet.

The whole or part of the example embodiments disclosed above can be described as, but not limited to, the following supplementary notes.

(Supplementary Note 1)

A transmit data volume control device comprising:

a communication quality acquisition means for acquiring a communication quality of a network;

a congestion degree estimation means for estimating a congestion degree of the network;

a target congestion degree determination means for determining a target congestion degree being a target of the congestion degree, based on the communication quality; and a transmit data volume determination means for determining a transmit data volume, based on the congestion degree and the target congestion degree.

(Supplementary Note 2)

The transmit data volume control device according to Supplementary note 1, wherein the transmit data volume determination means increases the transmit data volume when the congestion degree is less than the target congestion degree, and decreases the transmit data volume when the congestion degree is greater than the target congestion degree.

(Supplementary Note 3)

The transmit data volume control device according to Supplementary note 1 or 2, wherein the transmit data volume is an upper limit of the transmit data volume.

(Supplementary Note 4)

The transmit data volume control device according to Supplementary note 3, wherein the upper limit is any one of a congestion window size (cwnd), a set value of a transmit buffer size (SO_SNDBUF) in a communication connection, a memory size available to communication (tcp_wmem), the size being set as a system parameter, and a receive window size (RWIN) notified of by an acknowledgement (ACK) packet.

(Supplementary Note 5)

The transmit data volume control device according to any one of Supplementary notes 1 to 4, wherein the communication quality comprises a round trip time and/or a packet loss rate, and the target congestion degree determination means decreases the target congestion degree as the round trip time or the packet loss rate increases.

(Supplementary Note 6)

The transmit data volume control device according to any one of Supplementary notes 1 to 4, wherein the target congestion degree determination means determines the target congestion degree, based on an amount of variation in the communication quality.

(Supplementary Note 7)

The transmit data volume control device according to Supplementary note 6, wherein the target congestion degree determination means increases the target congestion degree as the amount of variation increases.

(Supplementary Note 8)

The transmit data volume control device according to Supplementary note 7, wherein the amount of variation is a variance, a standard deviation, or a value obtained by subtracting a minimum value from a maximum value of one or more of the congestion degrees in a certain past period or one or more values obtained by excluding an abnormal value from the congestion degrees in the certain past period through statistical processing.

(Supplementary Note 9)

The transmit data volume control device according to Supplementary note 7, wherein the target congestion degree determination means calculates the amount of variation by analyzing a stability level of a temporal change in the congestion degree from a trend of or a correlation among one or more of the congestion degrees in a certain past period.

(Supplementary Note 10)

The transmit data volume control device according to any one of Supplementary notes 1 to 9, wherein the congestion degree is a retained data volume retained in network equipment constituting the network, and the congestion degree estimation means comprises:

a non-retained data volume estimation means for estimating a non-retained data volume, based on the communication quality; and a retained data volume estimation means for calculating the retained data volume by subtracting the non-retained data volume from a data volume in flight obtained by subtracting an acknowledged data volume from a transmitted data volume.

(Supplementary Note 11)

The transmit data volume control device according to Supplementary note 10, wherein the non-retained data volume estimation means calculates an increment of the acknowledged data volume in a predetermined period, calculates a bandwidth estimate by dividing the increment by an elapsed time of the predetermined period, calculates a delay estimate, based on a minimum round trip time value in the predetermined period, and calculates the non-retained data volume by performing a multiplication the bandwidth estimate by the delay estimate.

(Supplementary Note 12)

The transmit data volume control device according to Supplementary note 11, wherein the non-retained data volume estimation means applies a filtering technique of eliminating influence of momentary variation to the bandwidth estimate and/or the delay estimate, and then performs the multiplication of the bandwidth estimate by the delay estimate.

(Supplementary Note 13)

The transmit data volume control device according to any one of Supplementary notes 1 to 9, further comprising:

a communication quality reception means for receiving communication quality information notifying of the communication quality, wherein the communication quality acquisition means acquires the communication quality from the communication quality information.

(Supplementary Note 14)

The transmit data volume control device according to Supplementary note 13, wherein the communication quality comprises an actual retained data volume retained in network equipment constituting the network, and the congestion degree estimation means sets the actual retained data volume as the congestion degree.

(Supplementary Note 15)

The transmit data volume control device according to Supplementary note 14, wherein the communication quality acquisition means acquires a transmitted data volume and an acknowledged data volume, and the congestion degree estimation means estimates the congestion degree by adding an increment of a data volume in flight from a time point of a previous estimation of the congestion degree to the actual retained data volume at the time point of the previous estimation of the congestion degree, the data volume in flight being obtained by subtracting the acknowledged data volume from the transmitted data volume.

(Supplementary Note 16)

A communication quality notification device comprising:

a communication quality notification means for acquiring a communication quality of a network and transmitting communication quality information notifying of the communication quality.

(Supplementary Note 17)

The communication quality notification device according to Supplementary note 16, wherein the communication quality comprises any one or more of an actual retained data volume actually retained in a buffer existing in the communication quality notification device, a value obtained by measuring the actual retained data volume for each data reception device, an indicator of a radio wave state, transmission throughput, an amount of wireless radio wave resource usage, or an execution history of a code modulation system for the each data reception device or in every communication session passing through the communication quality notification device, and a number of one or more users communicating with the communication quality notification device or a number of one or more communication sessions.

(Supplementary note 18)

A transmit data volume control system comprising:

the transmit data volume control device according to any one of Supplementary notes 1 to 15; and a data reception device that receives a data packet transmitted by the transmit data volume control device and transmits an ACK packet for the data packet, wherein the communication quality comprises a reception time and/or a reception interval of the ACK packet.

(Supplementary note 19)

A transmit data volume control system comprising:

the transmit data volume control device according to any one of Supplementary notes 13 to 15;

a data reception device that receives a data packet transmitted by the transmit data volume control device; and the communication quality notification device according to Supplementary note 16 or 17, wherein the communication quality notification device acquires the communication quality of the network between the transmit data volume control device and the data reception device.

(Supplementary Note 20)

A transmit data volume control system comprising:

the transmit data volume control device according to any one of Supplementary notes 10 to 12 and 15; and a data reception device that receives a data packet transmitted by the transmit data volume control device and transmits an ACK packet for the data packet, wherein the acknowledged data volume is a data volume of data acknowledged by the ACK packet.

(Supplementary Note 21)

A transmit data volume control method comprising:

acquiring a communication quality of a network;

estimating a congestion degree of the network;

determining a target congestion degree being a target of the congestion degree, based on the communication quality; and determining a transmit data volume, based on the congestion degree and the target congestion degree.

(Supplementary Note 22)

The transmit data volume control method according to Supplementary note 21, further comprising:

increasing the transmit data volume when the congestion degree is less than the target congestion degree, and decreasing the transmit data volume when the congestion degree is greater than the target congestion degree.

(Supplementary Note 23)

The transmit data volume control method according to Supplementary note 21 or 22, wherein the transmit data volume is an upper limit of the transmit data volume.

(Supplementary Note 24)

The transmit data volume control method according to Supplementary note 23, wherein the upper limit is any one of a congestion window size (cwnd), a set value of a transmit buffer size (SO_SNDBUF) in a communication connection, a memory size available to communication (tcp_wmem), the size being set as a system parameter, and a receive window size (RWIN) notified of by an acknowledgement (ACK) packet.

(Supplementary Note 25)

The transmit data volume control method according to any one of Supplementary notes 21 to 24, wherein the communication quality comprises a round trip time and/or a packet loss rate, and the transmit data volume control method further comprises decreasing the target congestion degree as the round trip time or the packet loss rate increases.

(Supplementary Note 26)

The transmit data volume control method according to any one of Supplementary notes 21 to 24, further comprising:

determining the target congestion degree, based on an amount of variation in the communication quality.

(Supplementary Note 27)

The transmit data volume control method according to Supplementary note 26, further comprising:

increasing the target congestion degree as the amount of variation increases.

(Supplementary Note 28)

The transmit data volume control method according to Supplementary note 27, wherein the amount of variation is a variance, a standard deviation, or a value obtained by subtracting a minimum value from a maximum value of one or more of the congestion degrees in a certain past period or one or more values obtained by excluding an abnormal value from the congestion degrees in the certain past period through statistical processing.

(Supplementary Note 29)

The transmit data volume control method according to Supplementary note 27, further comprising:

calculating the amount of variation by analyzing a stability level of a temporal change in the congestion degree from a trend of or a correlation among one or more of the congestion degrees in a certain past period.

(Supplementary Note 30)

The transmit data volume control method according to any one of Supplementary notes 21 to 29, wherein the congestion degree is a retained data volume retained in network equipment constituting the network, and the transmit data volume control method further comprises:

estimating a non-retained data volume, based on the communication quality; and calculating the retained data volume by subtracting the non-retained data volume from a data volume in flight obtained by subtracting an acknowledged data volume from a transmitted data volume.

(Supplementary Note 31)

The transmit data volume control method according to Supplementary note 30, further comprising:

calculating an increment of the acknowledged data volume in a predetermined period;

calculating a bandwidth estimate by dividing the increment by an elapsed time of the predetermined period;

calculating a delay estimate, based on a minimum round trip time value in the predetermined period; and calculating the non-retained data volume by performing a multiplication the bandwidth estimate by the delay estimate.

(Supplementary Note 32)

The transmit data volume control method according to Supplementary note 31, further comprising:

applying a filtering technique of eliminating influence of momentary variation to the bandwidth estimate and/or the delay estimate, and then performing the multiplication of the bandwidth estimate by the delay estimate.

(Supplementary Note 33)

The transmit data volume control method according to any one of Supplementary notes 21 to 29, further comprising:

receiving communication quality information notifying of the communication quality; and acquiring the communication quality from the communication quality information.

(Supplementary Note 34)

The transmit data volume control method according to Supplementary note 33, wherein the communication quality comprises an actual retained data volume retained in network equipment constituting the network, and the transmit data volume control method further comprises setting the actual retained data volume as the congestion degree.

(Supplementary Note 35)

The transmit data volume control method according to Supplementary note 34, further comprising:

acquiring a transmitted data volume and an acknowledged data volume; and estimating the congestion degree by adding an increment of a data volume in flight from a time point of a previous estimation of the congestion degree to the actual retained data volume at the time point of the previous estimation of the congestion degree, the data volume in flight being obtained by subtracting the acknowledged data volume from the transmitted data volume.

(Supplementary Note 36)

A communication quality notification method comprising:

acquiring a communication quality of a network; and transmitting communication quality information notifying of the communication quality.

(Supplementary Note 37)

The communication quality notification method according to Supplementary note 36, wherein the communication quality comprises any one or more of an actual retained data volume actually retained in an internally existing buffer, a value obtained by measuring the actual retained data volume for each data reception device, an indicator of a radio wave state, transmission throughput, an amount of wireless radio wave resource usage, or an execution history of a code modulation system for the each data reception device or in every communication session passing through a local device, and a number of one or more users communicating with a local device or a number of one or more communication sessions.

(Supplementary Note 38)

A transmit data volume control program causing a computer to execute:

a communication quality acquisition function of acquiring a communication quality of a network;

a congestion degree estimation function of estimating a congestion degree of the network;

a target congestion degree determination function of determining a target congestion degree being a target of the congestion degree, based on the communication quality; and a transmit data volume determination function of determining a transmit data volume, based on the congestion degree and the target congestion degree.

(Supplementary Note 39)

The transmit data volume control program according to Supplementary note 38, wherein the transmit data volume determination function increases the transmit data volume when the congestion degree is less than the target congestion degree, and decreases the transmit data volume when the congestion degree is greater than the target congestion degree.

(Supplementary Note 40)

The transmit data volume control program according to Supplementary note 38 or 39, wherein the transmit data volume is an upper limit of the transmit data volume.

(Supplementary Note 41)

The transmit data volume control program according to Supplementary note 40, wherein the upper limit is any one of a congestion window size (cwnd), a set value of a transmit buffer size (SO_SNDBUF) in a communication connection, a memory size available to communication (tcp_wmem), the size being set as a system parameter, and a receive window size (RWIN) notified of by an acknowledgement (ACK) packet.

(Supplementary Note 42)

The transmit data volume control program according to any one of Supplementary notes 38 to 41, wherein the communication quality comprises a round trip time and/or a packet loss rate, and the target congestion degree determination function decreases the target congestion degree as the round trip time or the packet loss rate increases.

(Supplementary Note 43)

The transmit data volume control program according to any one of Supplementary notes 38 to 41, wherein the target congestion degree determination function determines the target congestion degree, based on an amount of variation in the communication quality.

(Supplementary Note 44)

The transmit data volume control program according to Supplementary note 43, wherein the target congestion degree determination function increases the target congestion degree as the amount of variation increases.

(Supplementary Note 45)

The transmit data volume control program according to Supplementary note 44, wherein the amount of variation is a variance, a standard deviation, or a value obtained by subtracting a minimum value from a maximum value of one or more of the congestion degrees in a certain past period or one or more values obtained by excluding an abnormal value from the congestion degrees in the certain past period through statistical processing.

(Supplementary Note 46)

The transmit data volume control program according to Supplementary note 44, wherein the target congestion degree determination function calculates the amount of variation by analyzing a stability level of a temporal change in the congestion degree from a trend of or a correlation among one or more of the congestion degrees in a certain past period.

(Supplementary Note 47)

The transmit data volume control program according to any one of Supplementary notes 38 to 46, wherein the congestion degree is a retained data volume retained in network equipment constituting the network, and the congestion degree estimation function further causes a computer to execute:

a non-retained data volume estimation function of estimating a non-retained data volume, based on the communication quality; and a retained data volume estimation function of calculating the retained data volume by subtracting the non-retained data volume from a data volume in flight obtained by subtracting an acknowledged data volume from a transmitted data volume.

(Supplementary Note 48)

The transmit data volume control program according to Supplementary note 47, wherein the non-retained data volume estimation function calculates an increment of the acknowledged data volume in a predetermined period, calculates a bandwidth estimate by dividing the increment by an elapsed time of the predetermined period, calculates a delay estimate, based on a minimum round trip time value in the predetermined period, and calculates the non-retained data volume by performing a multiplication the bandwidth estimate by the delay estimate.

(Supplementary Note 49)

The transmit data volume control program according to Supplementary note 48, wherein the non-retained data volume estimation function applies a filtering technique of eliminating influence of momentary variation to the bandwidth estimate and/or the delay estimate, and then performs the multiplication of the bandwidth estimate by the delay estimate.

(Supplementary Note 50)

The transmit data volume control program according to any one of Supplementary notes 38 to 46, further causing a computer to execute a communication quality reception function of receiving communication quality information notifying of the communication quality, wherein the communication quality acquisition function acquires the communication quality from the communication quality information.

(Supplementary Note 51)

The transmit data volume control program according to Supplementary note 50, wherein the communication quality comprises an actual retained data volume retained in network equipment constituting the network, and the congestion degree estimation function sets the actual retained data volume as the congestion degree.

(Supplementary Note 52)

The transmit data volume control program according to Supplementary note 51, wherein the communication quality acquisition function acquires a transmitted data volume and an acknowledged data volume, and the congestion degree estimation function estimates the congestion degree by adding an increment of a data volume in flight from a time point of a previous estimation of the congestion degree to the actual retained data volume at the time point of the previous estimation of the congestion degree, the data volume in flight being obtained by subtracting the acknowledged data volume from the transmitted data volume.

(Supplementary Note 53)

A communication quality notification program causing a computer to execute:

a communication quality notification function of acquiring a communication quality of a network and transmitting communication quality information notifying of the communication quality.

(Supplementary Note 54)

The communication quality notification program according to Supplementary note 53, wherein the communication quality comprises any one or more of an actual retained data volume actually retained in an internally existing buffer, a value obtained by measuring the actual retained data volume for each data reception device, an indicator of a radio wave state, transmission throughput, an amount of wireless radio wave resource usage, or an execution history of a code modulation system for the each data reception device or in every communication session passing through a local device, and a number of one or more users communicating with a local device or a number of one or more communication sessions.

(Supplementary Note 55)

A computer readable recording medium recorded with the transmit data volume control program according to any one of Supplementary notes 38 to 52.

(Supplementary Note 56)

A computer readable recording medium recorded with the communication quality notification program according to Supplementary note 53 or 54.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2016-001570, filed on Jan. 7, 2016, the disclosure of which is incorporated herein in its entirety by reference.

REFERENCE SIGNS LIST 10, 20, 30 Transmit data volume control device
11 Communication quality acquisition unit
12 Congestion degree estimation unit
13 Target congestion degree determination unit
14 Transmit data volume determination unit
25 Data transmission-reception unit
36 Communication quality reception unit
50 Communication quality notification device
51 Communication quality notification unit
60 Data reception device
70 Network
80 Information processing device
81 Communication interface
82 Input-output interface
83 Arithmetic device
84 Storage device
85 Non-volatile storage device
86 Drive device
87 Recording medium

The invention claimed is:

1. A transmit data volume control device comprising:
at least one processor configured to implement:
a communication quality acquisitioner configured to acquire a communication quality of a network;
a congestion degree estimator configured to estimate a congestion degree of the network;
a target congestion degree determinator configured to determine a target congestion degree using an amount of variation in the communication quality; and
a transmit data volume determinator configured to determine a transmit data volume, using the congestion degree and the target congestion degree.

2. The transmit data volume control device according to claim 1, wherein the communication quality comprises at least one of a round trip time and a packet loss rate, and
wherein the target congestion degree determinator is configured to decrease the target congestion degree as the round trip time or the packet loss rate increases.

3. The transmit data volume control device according to claim 2, wherein the congestion degree is a retained data volume retained in network equipment constituting the network, and
wherein the congestion degree estimator comprises:
a non-retained data volume estimator configured to estimate a non-retained data volume, using the communication quality; and
a retained data volume estimator configured to calculate the retained data volume by subtracting the non-retained data volume from a data volume in flight obtained by subtracting an acknowledged data volume from a transmitted data volume.

4. The transmit data volume control device according to claim 2, wherein the at least one processor is further configured to implement:
a communication quality receiver configured to receive communication quality information notifying of the communication quality,
wherein the communication quality acquisitioner is configured to acquire the communication quality from the communication quality information.

5. The transmit data volume control device according to claim 1, wherein the target congestion degree determinator is configured to increase the target congestion degree as the amount of variation increases.

6. The transmit data volume control device according to claim 5, wherein the congestion degree is a retained data volume retained in network equipment constituting the network, and wherein the congestion degree estimator comprises:
a non-retained data volume estimator configured to estimate a non-retained data volume, using the communication quality; and
a retained data volume estimator configured to calculate the retained data volume by subtracting the non-retained data volume from a data volume in flight obtained by subtracting an acknowledged data volume from a transmitted data volume.

7. The transmit data volume control device according to claim 5, wherein the at least one processor is further configured to implement:
a communication quality receiver configured to receive communication quality information notifying of the communication quality,
wherein the communication quality acquisitioner is configured to acquire the communication quality from the communication quality information.

8. The transmit data volume control device according to claim 5, wherein the amount of variation is a variance, a standard deviation, or a value obtained by subtracting a minimum value from a maximum value of one or more of the congestion degrees in a certain past period or one or more values obtained by excluding an abnormal value from the congestion degrees in the certain past period through statistical processing.

9. The transmit data volume control device according to claim 8, wherein the congestion degree is a retained data volume retained in network equipment constituting the network, and
wherein the congestion degree estimator comprises:
a non-retained data volume estimator configured to estimate a non-retained data volume, using the communication quality; and
a retained data volume estimator configured to calculate the retained data volume by subtracting the non-retained data volume from a data volume in flight obtained by subtracting an acknowledged data volume from a transmitted data volume.

10. The transmit data volume control device according to claim 8, wherein the at least one processor is further configured to implement:
a communication quality receiver configured to receive communication quality information notifying of the communication quality,
wherein the communication quality acquisitioner is configured to acquire the communication quality from the communication quality information.

11. The transmit data volume control device according to claim 5, wherein the target congestion degree determinator is configured to calculate the amount of variation by analyzing a stability level of a temporal change in the congestion degree from a trend of or a correlation among one or more of the congestion degrees in a certain past period.

12. The transmit data volume control device according to claim 11, wherein the congestion degree is a retained data volume retained in network equipment constituting the network, and
wherein the congestion degree estimator comprises:
a non-retained data volume estimator configured to estimate a non-retained data volume, using the communication quality; and
a retained data volume estimator configured to calculate the retained data volume by subtracting the non-retained data volume from a data volume in flight obtained by subtracting an acknowledged data volume from a transmitted data volume.

13. The transmit data volume control device according to claim 11, wherein the at least one processor is further configured to implement:
a communication quality receiver configured to receive communication quality information notifying of the communication quality,
wherein the communication quality acquisitioner is configured to acquire the communication quality from the communication quality information.

14. The transmit data volume control device according to claim 1, wherein the congestion degree is a retained data volume retained in network equipment constituting the network, and
wherein the congestion degree estimator comprises:
a non-retained data volume estimator configured to estimate a non-retained data volume, using the communication quality; and
a retained data volume estimator configured to calculate the retained data volume by subtracting the non-retained data volume from a data volume in flight obtained by subtracting an acknowledged data volume from a transmitted data volume.

15. The transmit data volume control device according to claim 14, wherein the non-retained data volume estimator is configured to:
calculate an increment of the acknowledged data volume in a predetermined period;
calculate a bandwidth estimate by dividing the increment by an elapsed time of the predetermined period;
calculate a delay estimate, using a minimum round trip time value in the predetermined period; and
calculate the non-retained data volume by performing a multiplication the bandwidth estimate by the delay estimate.

16. The transmit data volume control device according to claim 15, wherein the non-retained data volume estimator is configured to apply a filtering technique of eliminating influence of momentary variation to at least one of the bandwidth estimate and the delay estimate, and then perform the multiplication of the bandwidth estimate by the delay estimate.

17. The transmit data volume control device according to claim 1, wherein the at least one processor is further configured to implement:
a communication quality receiver configured to receive communication quality information notifying of the communication quality,
wherein the communication quality acquisitioner is configured to acquire the communication quality from the communication quality information.

18. The transmit data volume control device according to claim 17, wherein the communication quality comprises an actual retained data volume retained in network equipment constituting the network,
wherein the congestion degree estimator is configured to set the actual retained data volume as the congestion degree,
wherein the communication quality acquisitioner is configured to acquire a transmitted data volume and an acknowledged data volume, and
wherein the congestion degree estimator is configured to estimate the congestion degree by adding an increment of a data volume in flight from a time point of a previous estimation of the congestion degree to the actual retained data volume at the time point of the previous estimation of the congestion degree, the data volume in flight being obtained by subtracting the acknowledged data volume from the transmitted data volume.

19. A transmit data volume control method comprising:

acquiring, by at least one processor, a communication quality of a network;

estimating, by the at least one processor, a congestion degree of the network;

determining, by the at least one processor, a target congestion degree using an amount of variation in the communication quality; and determining, by the at least one processor, a transmit data volume, using the congestion degree and the target congestion degree.

20. A non-transitory computer readable recording medium recorded with a transmit data volume control program that, if executed, causes a computer to execute operations comprising:

a communication quality acquisition function of acquiring a communication quality of a network;

a congestion degree estimation function of estimating a congestion degree of the network;

a target congestion degree determination function of determining a target congestion degree using an amount of variation in the communication quality; and a transmit data volume determination function of determining a transmit data volume, using the congestion degree and the target congestion degree.

* * * * *